US009588951B2

(12) United States Patent
Hill et al.

(10) Patent No.: US 9,588,951 B2
(45) Date of Patent: Mar. 7, 2017

(54) ANNOTATION METHOD AND SYSTEM FOR CONFERENCING

(75) Inventors: Douglas Blair Hill, Calgary (CA);
Bradley James Bax, Calgary (CA);
Alexander Garin, Calgary (CA);
Jeffrey Adam Mahovsky, Glendale, CA (US)

(73) Assignee: SMART TECHNOLOGIES ULC, Calgary (CA)

( * ) Notice: Subject to any disclaimer, the term of this patent is extended or adjusted under 35 U.S.C. 154(b) by 1251 days.

(21) Appl. No.: 13/312,992

(22) Filed: Dec. 6, 2011

(65) Prior Publication Data
US 2012/0144283 A1 Jun. 7, 2012

Related U.S. Application Data

(60) Provisional application No. 61/420,241, filed on Dec. 6, 2010, provisional application No. 61/454,492, filed on Mar. 18, 2011.

(51) Int. Cl.
*G06F 17/00* (2006.01)
*G06F 17/24* (2006.01)
(52) U.S. Cl.
CPC .......... *G06F 17/242* (2013.01); *G06F 17/241* (2013.01)
(58) Field of Classification Search
CPC .................................................. G06F 17/241
USPC ................................................. 715/200, 230
See application file for complete search history.

(56) References Cited

U.S. PATENT DOCUMENTS

| 5,870,547 | A | * | 2/1999 | Pommier et al. ............. 709/204 |
| 8,069,194 | B1 | * | 11/2011 | Manber et al. ............... 715/230 |
| 2004/0205547 | A1 | * | 10/2004 | Feldt et al. ................... 715/512 |
| 2004/0233197 | A1 | * | 11/2004 | Liu et al. ...................... 345/442 |
| 2005/0069225 | A1 | * | 3/2005 | Schneider et al. ............ 382/305 |
| 2006/0224950 | A1 | * | 10/2006 | Takaai et al. ................. 715/512 |
| 2006/0282762 | A1 | * | 12/2006 | Diamond et al. ............. 715/511 |
| 2007/0067707 | A1 | * | 3/2007 | Travis et al. ............... 715/500.1 |
| 2008/0098295 | A1 | | 4/2008 | Nelson et al. |
| 2009/0154893 | A1 | | 6/2009 | Vasudevan et al. |
| 2011/0169736 | A1 | | 7/2011 | Bolt et al. |

FOREIGN PATENT DOCUMENTS

WO 2010/104400 A1 9/2010

OTHER PUBLICATIONS

Transmittal; International Search Report; and the Written Opinion of the International Searching Authority for International Patent Application No. PCT/CA2011/001340 with a mailing date of Apr. 17, 2012.

* cited by examiner

*Primary Examiner* — Stephen Hong
*Assistant Examiner* — Gregory J Vaughn
(74) *Attorney, Agent, or Firm* — Perkins Coie LLP

(57) ABSTRACT

A conferencing system comprises a plurality of computing devices communicating over at least one network during a conference session, at least one of the computing devices being configured to share content displayed thereby with other computing devices, the other computing devices displaying the shared content, at least one of the computing devices also being configured to accept input annotations made on the displayed shared content and to share input annotations with other computing devices over a channel independent of the shared content.

13 Claims, 18 Drawing Sheets

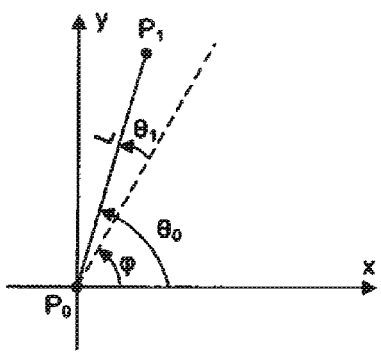
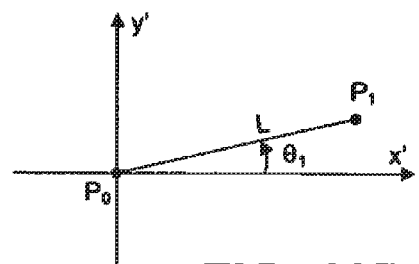
FIG. 10A
FIG. 10B
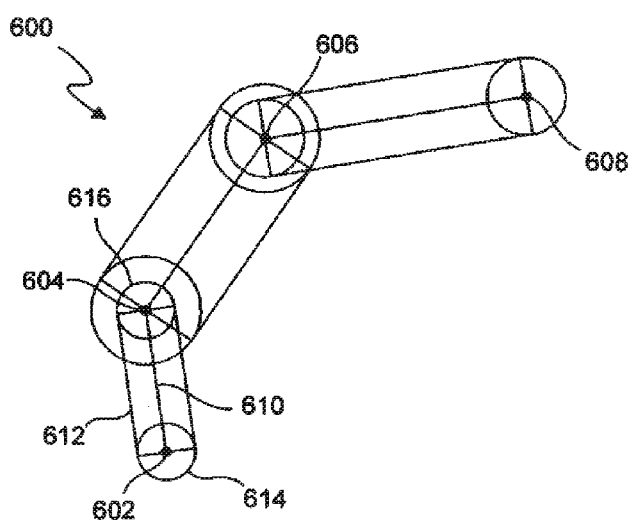
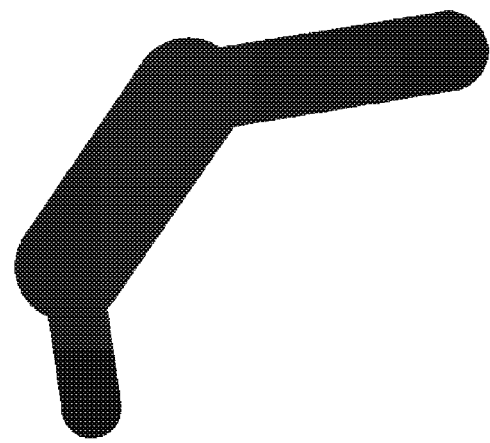
FIG. 11A
FIG. 11B

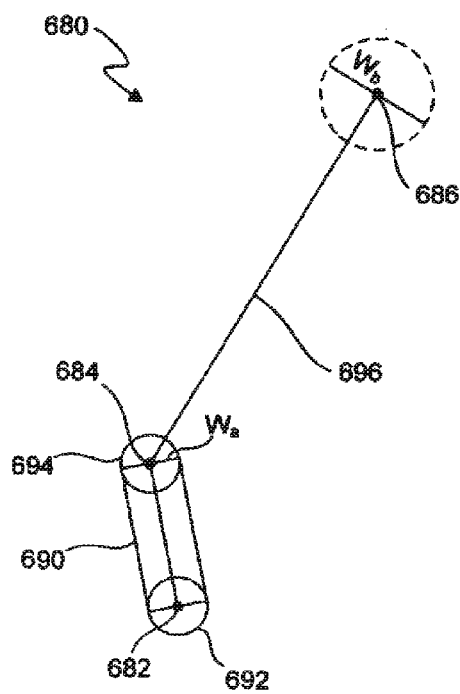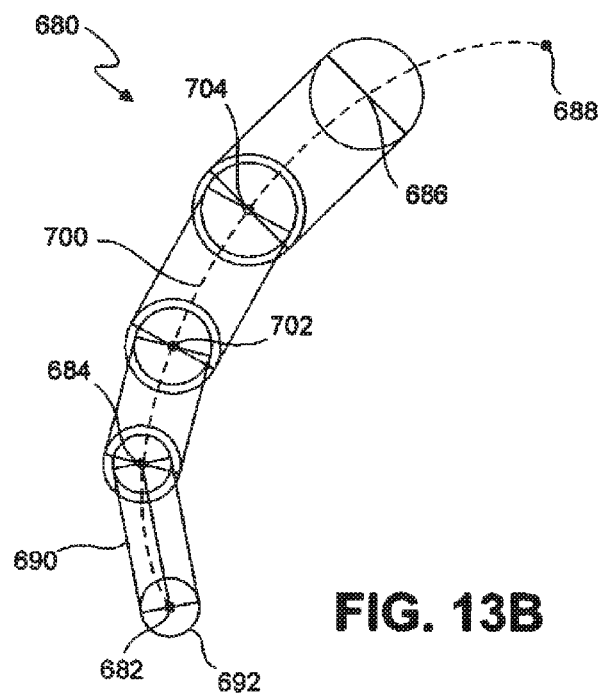
FIG. 13A
FIG. 13B

ANNOTATION METHOD AND SYSTEM FOR CONFERENCING

CROSS-REFERENCE TO RELATED APPLICATIONS

This application claims the benefit of U.S. Provisional Application No. 61/420,241 to Hill et al. filed on Dec. 6, 2010 and U.S. Provisional Application No. 61/454,492 to Mahovsky filed on Mar. 18, 2011, both entitled "Annotation Method and System for Conferencing", the entire contents of which are incorporated by reference.

FIELD OF THE INVENTION

The present invention relates generally to an annotation method and system for conferencing.

BACKGROUND OF THE INVENTION

Conferencing systems that allow participants to collaborate from different locations, such as for example, SMART Bridgit™, Microsoft® Live Meeting, Cisco® MeetingPlace, Cisco® WebEx, etc., are well known. These conferencing systems allow meeting participants to exchange voice, audio, video, computer display screen images and/or files. Some conferencing systems also provide tools to allow participants to collaborate on the same topic by sharing content, such as for example, display screen images or files amongst participants. In some cases, annotation tools are provided that allow participants to modify shared display screen images and then distribute the modified display screen images to other participants.

For example, SMART Bridgit™ offered by SMART Technologies ULC of Calgary, Alberta, Canada, assignee of the subject application, allows a user to set up a conference having an assigned conference name and password at a Bridgit™ server. Conference participants at different locations may join the conference by providing the correct conference name and password to the Bridgit™ server. During the conference, voice and video connections are established between participants via the Bridgit™ server. A participant may share one or more computer display screen images so that the display screens images are distributed to all participants. Pen tools and an eraser tool can be used to annotate on shared display screen images, e.g., inject ink annotation onto shared display screen images or erase one or more segments of ink from shared display screen images. The annotations made on the shared display screen images are then distributed to all participants.

In existing conferencing systems that allow participants to modify shared display screen images, the facility that detects and shares annotations is an integrated part of the conferencing systems. As a result, incorporating an annotation facility of an existing conferencing system into its upgraded or function-expanded version, or into a third-party conferencing system is generally a burden to system developers and system administrators.

As will be appreciated, improvements in conferencing systems are desired. It is therefore an object of the present invention to provide a novel annotation method and a novel system for conferencing.

SUMMARY OF THE INVENTION

Accordingly, in one aspect there is provided a conferencing system comprising a plurality of computing devices communicating over at least one network during a conference session, at least one of said computing devices being configured to share content displayed thereby with other computing devices, said other computing devices displaying the shared content, at least one of said computing devices also being configured to accept input annotations made on the displayed shared content and to share input annotations with other computing devices over a channel independent of the shared content.

According to another aspect there is provided a method comprising: accepting annotations input on an image displayed by a computing device that is shared with at least one other computing device; and transmitting said input annotations to said at least one other computing devices via a connection that is independent of the connection over which the image is shared.

According to another aspect there is provided a method of drawing a calligraphic ink portion layer, said ink portion comprising a plurality of input points, the method comprising: determining whether the distance between consecutive input points of the ink portion being drawn does not exceed a threshold; ignoring the latter consecutive sample point when said distance is less than said threshold, else joining said consecutive input points with a line and calculating an angle of said line; and calculating a width of said pointer tip based on said angle, said width being applied to said ink portion drawn between said consecutive sample points.

According to another aspect there is provided a method of drawing a calligraphic ink portion, said ink portion comprising a plurality of input points, the method comprising calculating lines extending between consecutive input points; determining shapes surrounding said input points, at least some of said shapes being selected based on the angle between adjacent calculated lines; for each pair of consecutive input points, joining the perimeters of the shapes surrounding the consecutive input points with lines on opposite sides of the calculated line extending between the consecutive input points; and using the lines and portions of the shapes to define an outline of the ink portion.

BRIEF DESCRIPTION OF THE DRAWINGS

Embodiments will now be described more fully with reference to the accompanying drawings in which:

FIGS. 10A and 10B illustrate calculation of the angle of a line extending between two consecutive ink sample points;

FIGS. 11A and 11B illustrate rendering of a calligraphic ink segment;

FIGS. 13A to 13C illustrate a calligraphic ink segment formation technique comprising points inserted using linear interpolation;

DETAILED DESCRIPTION OF THE EMBODIMENTS

A conferencing system that employs annotation and calligraphic ink rendering facilities is described herein. The conferencing system comprises a plurality of computing devices that communicate with each other over at least one network when a conference session has been established. At least one of the computing devices, and in one embodiment, each of the computing devices, is configured to share content displayed thereby with the other computing devices allowing the shared content to be displayed by the other computing devices. A plurality of the computing devices, and in one embodiment, each of the computing devices, is also configured to accept input annotations made on the displayed shared content and to share input annotations with other computing devices over a channel independent of the shared content. Further specifics of the conferencing system and annotation and calligraphic ink rendering facilities will now be described with reference to the figures.

Figure 1A:
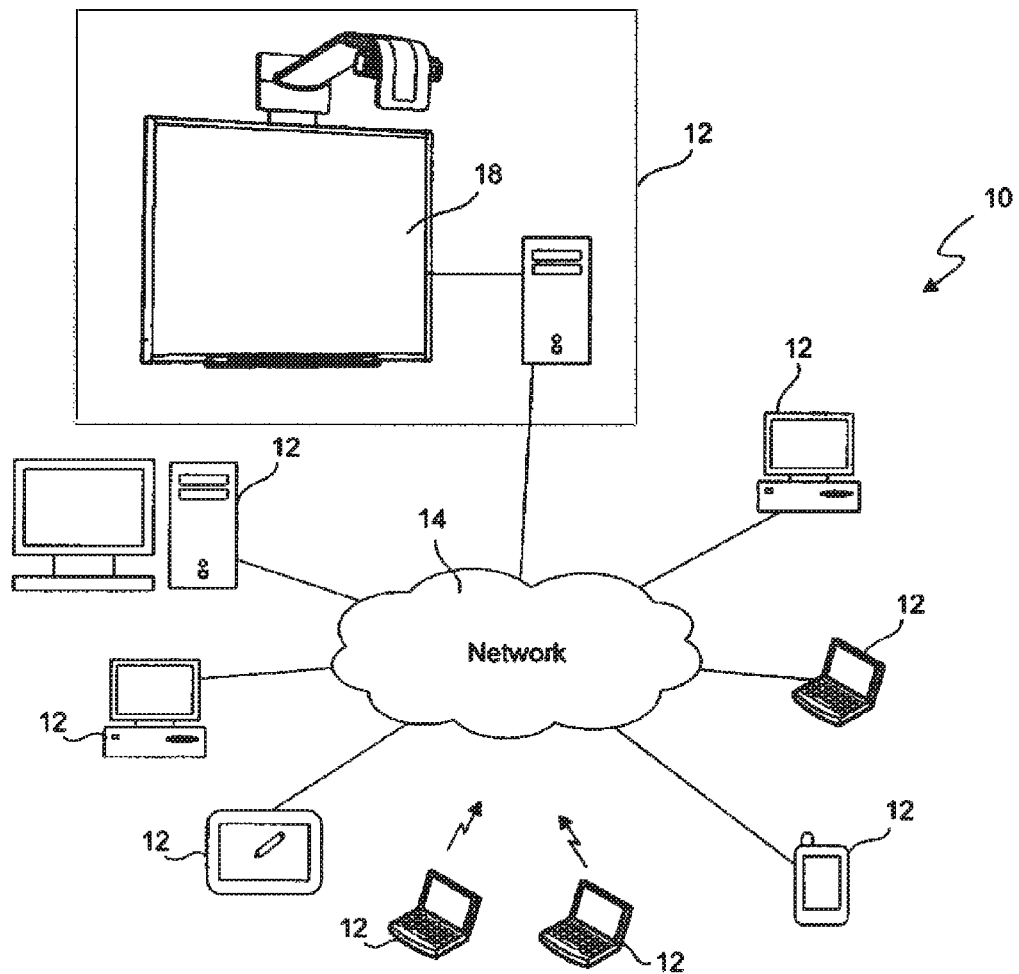
FIG. 1A is a schematic representation of a conferencing system comprising a plurality of computing devices communicating over a network.

Turning now to FIG. 1A, a conferencing system is shown and is generally identified by reference numeral 10. As can be seen, conferencing system 10 comprises a plurality of computing devices 12 in communication with each other via a network 14. In this exemplary embodiment, the network 14 is an Intranet within an organization; however the network 14 may alternatively be of another form, such as for example, a local area network (LAN) within the organization, a cellular network, the Internet, or a mixture of different networks. Depending on the nature of the computing devices 12, the computing devices 12 may communicate with the network 14 either over a wireless connection, a wired connection or a combined wireless and wired connection.

The computing devices 12 may take a variety of forms, such as for example, personal computers, laptop computers, tablet computers, computer servers, computerized kiosks, personal digital assistants (PDAs), cellular phones, smartphones, interactive boards etc. For example, in the conferencing system 10 shown in FIG. 1A, the computing devices 12 comprise three (3) laptop computers, three (3) personal computers, one (1) tablet computer, one (1) cellular phone and one (1) computer and associated interactive board combination. Those of skill in the art will appreciate that the various computing devices 12 shown in FIG. 1A is for ease of illustration only. The conferencing system 10 may include fewer or more computing devices 12 than illustrated and may include a different makeup of computing devices than illustrated.

Regardless of the specific form, each computing device 12 typically comprises, for example, a processing unit, system memory (volatile and/or non-volatile memory), other non-removable memory and/or optional removable memory (e.g. a hard disk drive, RAM, ROM, EEPROM, CD-ROM, DVD, flash memory, etc.), input/output devices (e.g. a display screen, a mouse, a keyboard, one or more buttons etc.), and a system bus coupling the various components to the processing unit. The display screen can present various types of information to the user such as graphical and textual displays. Depending on the type of computing device 12, the display screen may also function as an input mechanism that accepts touch input made thereon using a pointer such as for example a pen tool, an eraser tool, a finger or other suitable object. One or more of the computing devices 12 may also comprise networking capabilities using Ethernet, WiFi, and/or other network format, to enable connection to shared or remote drives, one or more networked computers, or other networked devices. One or more computing devices 12 may be physically located in a conference room or other common location while other computing devices may be located at different geographical locations.

Figure 1B:
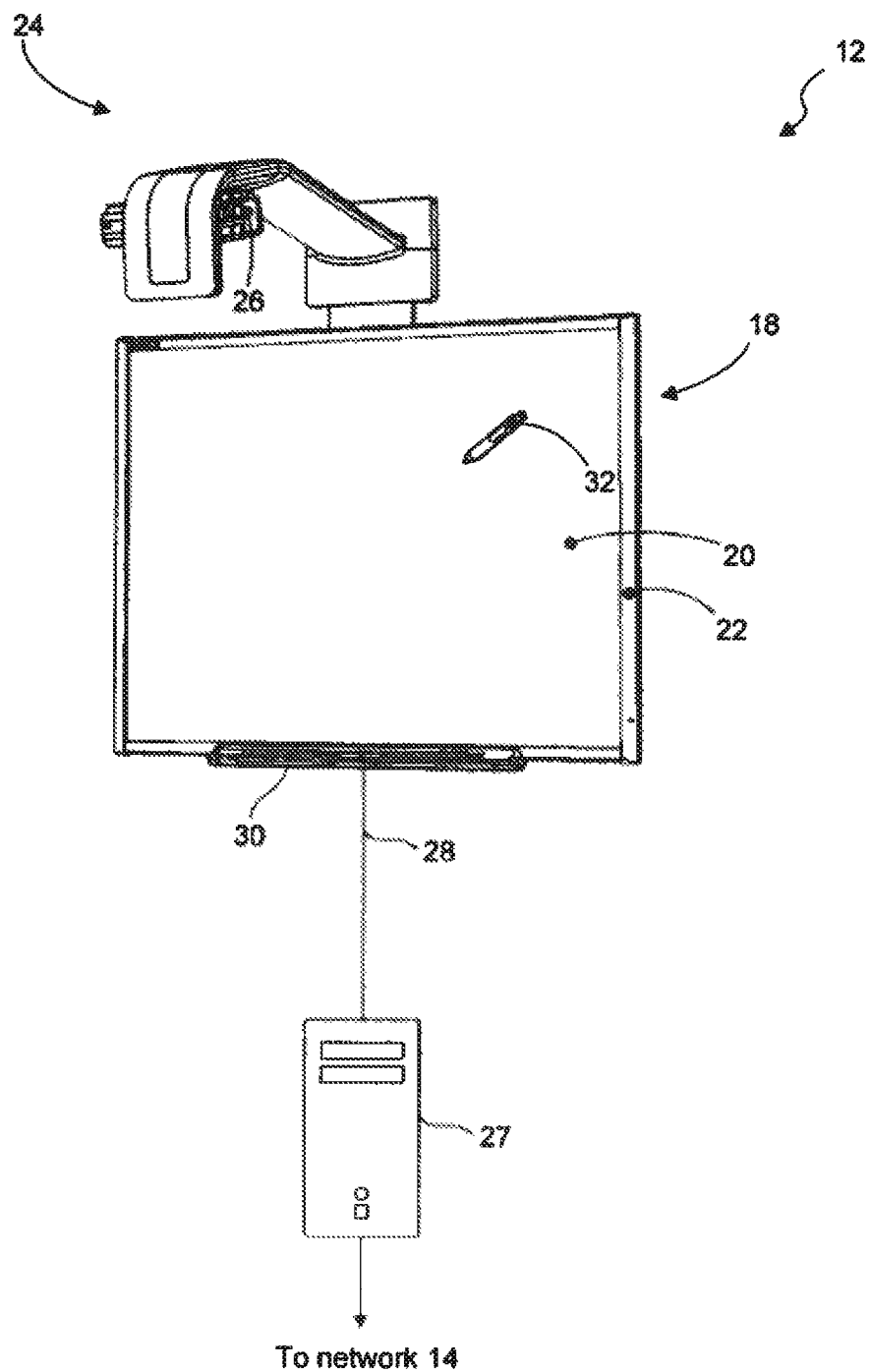
FIG. 1B is an exemplary computing device, comprising an interactive board and a computer, forming part of the conferencing system of FIG. 1A.

FIG. 1B better illustrates the computing device 12 that comprises the interactive board 18 and the computer 27. As can be seen, interactive board 18 is mounted on a vertical support surface such as for example a wall surface or otherwise supported or suspended in a vertical orientation and comprises a generally planar, rectangular interactive surface 20 that is surrounded about its periphery by a bezel 22. A boom assembly 24 is also mounted on the support surface above the interactive board 18. Boom assembly 24 supports a short-throw projector 26 such as that sold by SMART Technologies ULC under the name "SMART Unifi 45", which projects an image, such as for example, a computer desktop, onto the interactive surface 20.

The interactive board 18 employs machine vision to detect one or more pointers brought into a region of interest in proximity with the interactive surface 20. The interactive board 18 communicates with the computer 27 via a universal serial bus (USB) cable 28 or other suitable wired or wireless communication link. Computer 27 executes one or more application programs and processes the output of the interactive board 18 that is generated when a pointer is brought into proximity with the interactive surface 20. In response, computer 27 adjusts image data that is output to the projector 26, if required, so that the image presented on the interactive surface 20 reflects pointer activity. In this manner, the interactive board 18, computer 27 and projector 26 allow pointer activity proximate to the interactive surface 20 to be recorded as writing or drawing or used to control execution of one or more application programs executed by the computer 27.

The bezel 22 is mechanically fastened to the interactive surface 20 and comprises four bezel segments that extend along the edges of the interactive surface 20. In this embodiment, the inwardly facing surface of each bezel segment comprises a single, longitudinally extending strip or band of retro-reflective material. To take best advantage of the properties of the retro-reflective material, the bezel segments are oriented so that their inwardly facing surfaces lie in a plane generally normal to the plane of the interactive surface 20.

A tool tray 30 is affixed to the interactive board 18 adjacent the bottom bezel segment using suitable fasteners such as for example, screws, clips, adhesive etc. The tool tray 30 comprises a housing having an upper surface configured to define a plurality of receptacles or slots. The receptacles are sized to receive one or more pen tools 32 as well as an eraser tool (not shown) that can be used to interact with the interactive surface 20. Control buttons (not shown) are also provided on the upper surface of the tool tray housing to enable a user to control operation of the interactive board 18. Further specifics of the interactive board 18 are described in U.S. Patent Application Publication No. 2011/0169736 to Bolt et al., filed on Feb. 19, 2010, and entitled "INTERACTIVE INPUT SYSTEM AND TOOL TRAY THEREFOR", assigned to SMART Technologies ULC, the content of which is incorporated herein by reference in its entirety.

Figure 2:
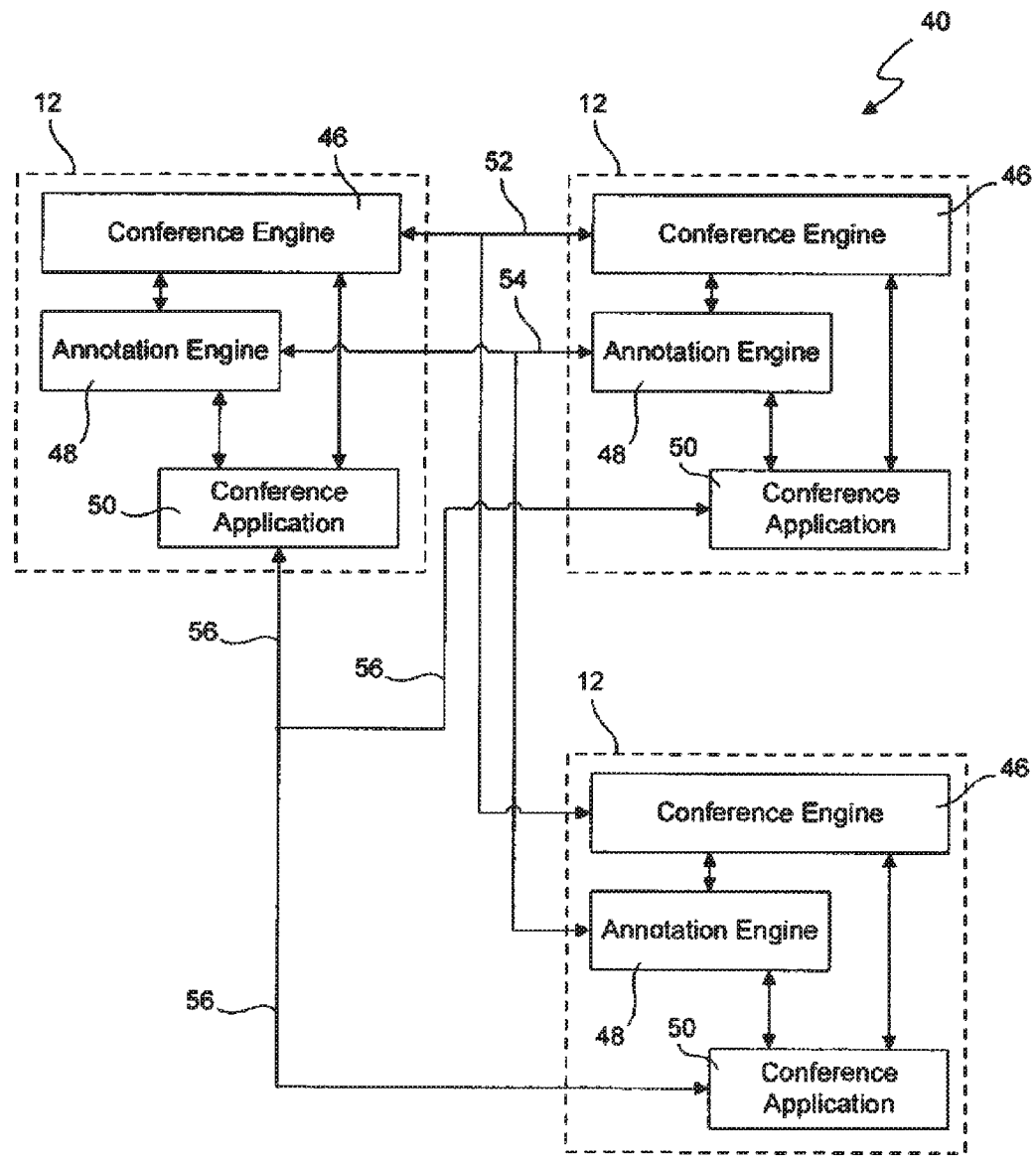
FIG. 2 is a schematic diagram of a subset of the computing devices forming part of the conferencing system of FIG. 1A.

Each of the computing devices 12 runs an operating system which includes a graphical user interface (GUI) and applications that are displayed on its display screen. The GUI comprises, but is not limited to, the "desktop" of the operating system, controls such as taskbars and scroll bars, icons and application windows. As shown in FIG. 2, each computing device 12 also comprises a conference engine 46, an annotation engine 48 and a conference application 50 that communicate with each other. The conference and annotation engines 46 and 48 and the conference application 50 allow each computing device 12 to establish a conference session and once a conference session has been established, allow audio, video, display screen images and/or files as well as annotations made on shared display screen images to be shared amongst conference session participants as will be described.

When one of the computing devices 12 initiates a conference session, invitations are sent to other computing devices allowing those other computing devices to accept the invitations and join the conference session. As other computing devices 12 join the conference session, the conference engine 46 of the computing device 12 that initiated the conference session establishes a connection 52 with the conference engines 46 of the other computing devices 12 via network 14 and maintains a list of the computing devices that have joined the conference session. The computing device 12 that initiates the conference session is designated as the host computing device 12 while the other computing devices 12 that have joined the conference session are designated as client computing devices 12. Also, during the conference session any computing device 12 that receives input from an input device coupled thereto and injects digital ink annotations onto a displayed screen image that is shared with other computing devices during the conference session is designated as a presenting computing device 12. Computing devices that receive annotations from the presenting computing device 12 are also designated as client computing devices.

After the connection 52 between conference engines 46 of the computing devices 12 participating in the conference session has been established, the conference engine 46 of the host computing device 12 passes the list of other computing devices 12 in the conference session to its conference application 50, which in turn establishes a connection 56 with the conference applications 50 running on the other computing devices 12 in the list. At this stage, audio, video, computer display screen images and/or files may be shared amongst the computing devices participating in the conference session. Any computing device 12 may share at least a portion of its display screen image, e.g., a window, a region of the display screen image or the full display screen image, with other computing devices 12, via the conference application 50.

Each computing device 12 in the conference session supports two input modes namely, an annotation mode and a cursor mode depending on the status of the input devices connected thereto. When a computing device 12 is in the annotation mode, the annotation engine 48 overlies at least a portion of the display screen image with a transparent annotation layer. As a result, in the annotation mode an input device, such as a pointer, may be used to inject digital ink onto the transparent annotation layer or delete digital ink from the transparent annotation layer. For example, in the case of the interactive board 18, the annotation mode is activated when a pointer 32, e.g., a pen tool or eraser tool is picked up from the tool tray 30, or a pen or eraser icon displayed on the interactive surface 20 is selected resulting in the annotation engine 48 overlying the interactive surface 20 with a transparent annotation layer. Touching the pointer 32 on the interactive surface 20 of the interactive board 18, or pressing a mouse button, triggers a pointer down event signifying the start of an annotation input operation and the beginning of a digital ink drawing process. During the annotation input operation, the contact position of the pointer down event is recorded by the annotation engine 48 and a unique identifier (ink ID) is automatically assigned to the annotation input operation by the annotation engine 48. Following the pointer down event, moving the pointer 32 on the interactive surface 20 or moving the mouse triggers a series of pointer move events, which results in the annotation engine 48 drawing digital ink on the transparent annotation layer following a path that joins the pointer down event and contact positions of the series of pointer move events. Lifting the pointer 32 from the interactive surface 20 or releasing the mouse button triggers a pointer up event which completes the digital ink drawing process and signifies the end of the annotation input operation.

Figure 3:
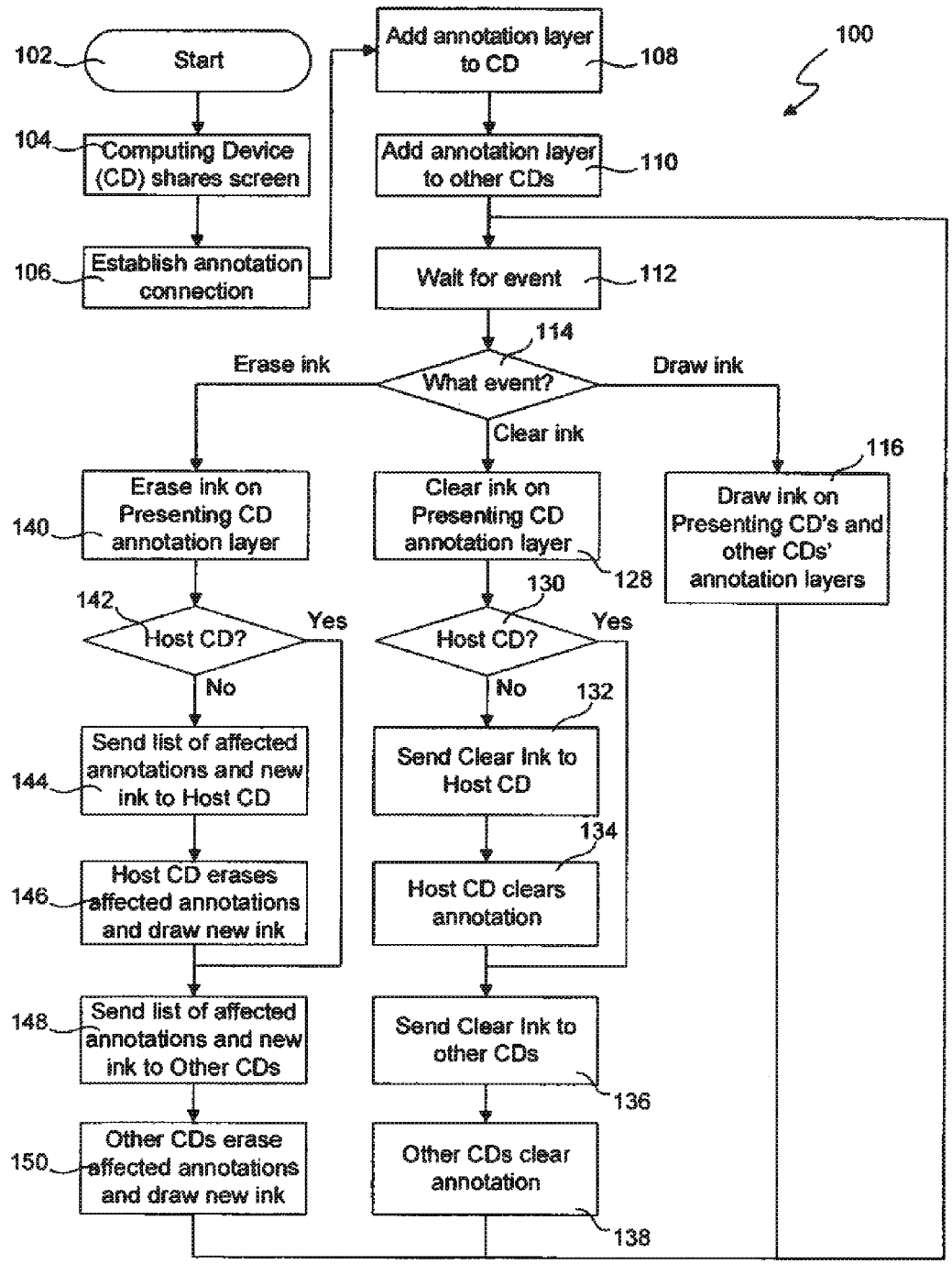
FIG. 3 is a flowchart showing exemplary annotation steps.

Exemplary annotation steps are shown in FIG. 3 and are generally identified by reference numeral 100. The process starts after the connections 52 and 56 between the conference engines 46 and the conference applications 50 have been established (step 102), and the conference application 50 of one of the computing devices 12 shares a display screen image with other computing devices 12. As mentioned above, the shared display screen image may comprise a window, a region of the entire display screen image, or the entire display screen image (step 104). For example, at the computing device 12 that is sharing the display screen image, the conference engine 46 searches for the display screen image to be shared and notifies the annotation engine 48, which establishes an annotation connection 54 with the annotation engines 48 of the other computing devices 12 (step 106). The annotation engine 48 at the computing device 12 sharing the display screen image then superimposes the transparent annotation layer over its display screen image (step 108). At each other computing device 12 that has received the shared display screen image, the annotation engine 48 thereof also superimposes the transparent annotation layer over the received shared display screen image (step 110).

After superimposing the annotation layers, each of the computing devices 12 waits for an input event generated as a result of input made using an input device 18 connected thereto (step 112). When a computing device 12 receives an input event resulting in the computing device becoming a presenting computing device 12, the annotation engine 48 of the presenting computing device examines the input event to determine the characteristics of the input event (step 114). In this embodiment, the annotation engine 48 examines the input event to determine if the input event is a Draw Ink input event, an Erase Ink input event or a Clear Ink input event. For example, in the case of interactive board 18, when a pen tool 32 is picked up from the pen tray 30 (or by selecting a pen icon) and is used to contact the interactive surface 20, a Draw Ink input event is generated. As a result, the pointer down event together with subsequent pointer move events are recorded by the presenting computing device 12 and corresponding digital ink is injected onto the transparent annotation layer (step 116) superimposed on the interactive surface 20 of the interactive board 18. The injected digital ink is also communicated to the other client computing devices in the conference session via annotation messages and injected onto the transparent annotation layers thereof as will be further described herein. Following this, the process returns to step 112 to await receipt of further events.

At the presenting computing device 12, when the annotation engine 48 determines that the input event is a Clear Ink input event (step 114), the annotation engine 48 clears all ink annotations on its annotation layer (step 128). At step 130, when the presenting computing device 12 is the host computing device 12, the annotation engine 48 sends the Clear Ink input event to the other client computing devices 12 in the conference session (step 136). When the presenting computing device 12 is not the host computing device, the presenting computing device 12 sends the Clear Ink input event to the host computing device 12 (step 132). In response, the annotation engine 48 of the host computing device 12 clears all ink annotations on its annotation layer (step 134), and sends a Clear Ink input event to the other client computing devices 12 participating in the conference session (step 136). When the other computing devices 12 receive the Clear Ink input event from the host computing device 12, the annotation engines 48 of the other computing devices 12 clear all ink annotations from their respective annotation layers, (step 138), and the process returns to step 112 to await receipt of further events.

When the annotation engine 48 at the presenting computing device 12 determines that the input event is an Erase Ink input event (e.g., when an eraser tool is picked up from the tool tray 30 (or an erase icon selected) and is used to contact the interactive surface 20 at location where digital ink exists (step 114), the annotation engine 48 erases ink annotations on its annotation layer (step 140), as will be described later. In general, the ink annotations affected by the eraser tool are deleted and new ink annotations are drawn on the annotation layer. When the presenting computing device 12 is also the host computing device 12 (step 142), an annotation message comprising a list of unique identifiers (IDs) associated with the ink annotations affected by the eraser tool and the new ink annotations is sent to the other computing devices 12 (step 148). However, when the presenting computing device 12 is not the host computing device 12, the annotation message is sent to the host computing device 12 (step 144). In response, the annotation engine of the host computing device 12 erases the ink annotations identified by the received list of ink IDs, and draws the new ink annotations on its annotation layer (step 146). The host computing device 12 then sends the received list of ink IDs and the new ink annotations to the other computing devices 12. In response, the annotation engines of the other computing devices 12 erase the ink annotations identified by the received list of ink IDs, and draw the new ink annotations on their respective annotation layers (step 150). The process then returns to step 112. Although not shown in FIG. 3, the process ends when the host computing device 12 initiates a command to end the conference session, however, in some alternative embodiments, one of the other computing devices 12 may initiate the command to end the conference session.

The cursor mode is activated when, e.g., a pen tool or eraser tool is placed back on the tool tray 30 of the interactive board 18, or a cursor icon is selected. In the cursor mode, an input device may be used to select digital objects or control the execution of application programs. The cursor mode is known in the art and therefore, further specifics will not be described herein.

FIGS. 4A to 5B illustrate an example of superimposing a transparent annotation layer over display screen images. As will be appreciated, the particular implementation of superimposing a transparent annotation layer over display screen images depends on the particular conference application 50 used in the conferencing system 10. In this embodiment, the conference application 50 is Microsoft® Live Meeting, from Microsoft Corporation of Redmond, Wash., U.S.A. Thus, the conference application 50 superimposes a transparent window having a class ID LiveMeeting: FrameWindow over the display screen image to be shared. At each of the other computing devices 12, the shared display screen image is displayed inside the Microsoft® Live Meeting application window.

Figure 4A:
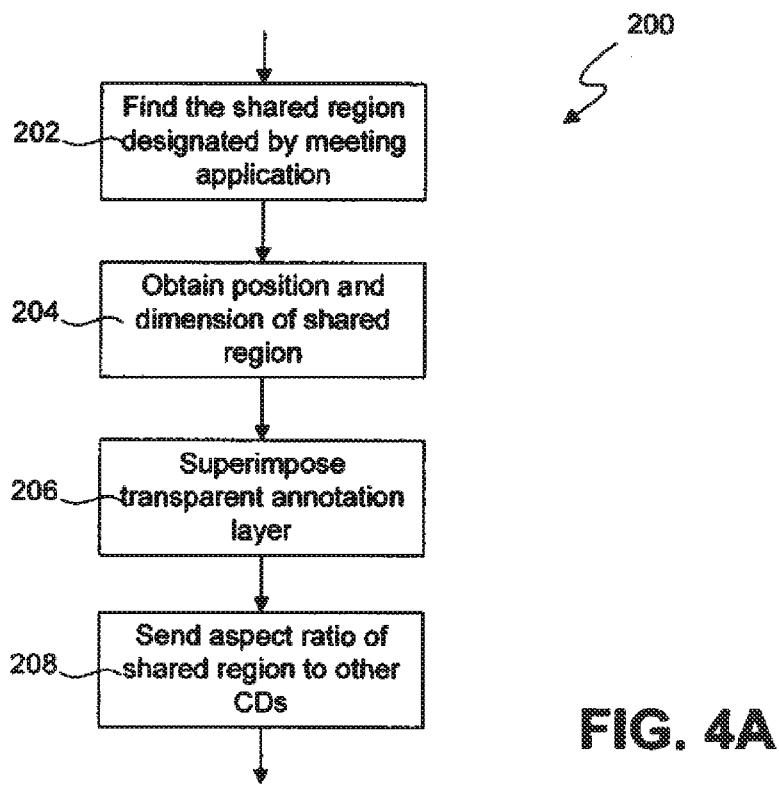
FIG. 4A is a flowchart showing exemplary steps for superimposing a transparent annotation layer over a shared display region.
Figure 4B:
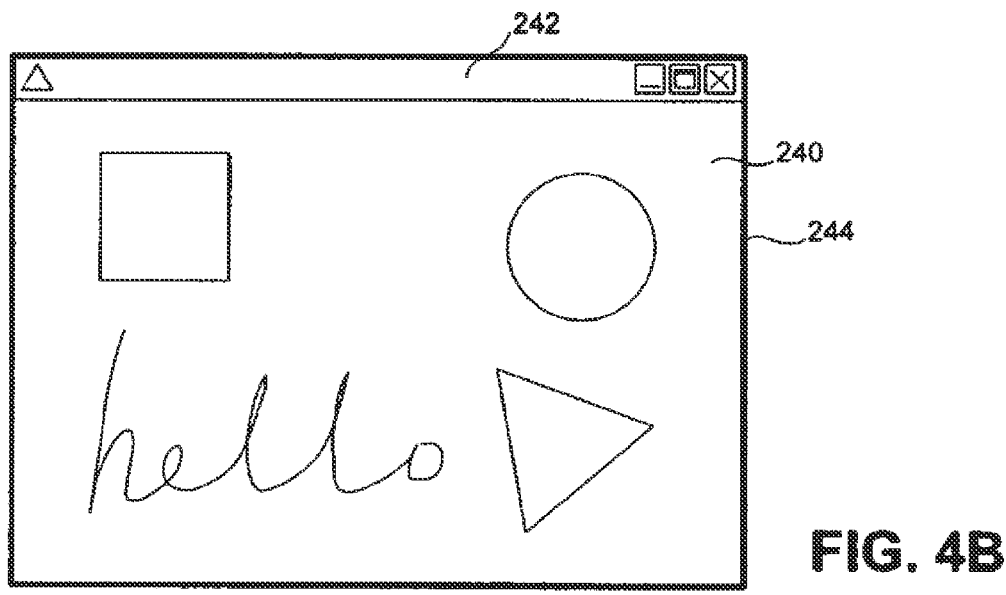
FIG. 4B shows an exemplary graphical user interface ("GUI") with a shared display region.

FIG. 4A shows a flowchart of exemplary steps for superimposing a transparent annotation layer over the display screen image at the presenting computing device 12 to be shared (step 108) and is generally identified by reference numeral 200. At step 202, the annotation engine 48 of the presenting computing device 12 determines the region of the display screen image to be shared designated by conference application 50. For example, as shown in FIG. 4B, Microsoft® Live Meeting designates a region 240 overlapping a window 242 by superimposing a transparent window 240 having a class ID LiveMeeting: FrameWindow over the window 242. Therefore, in this example, the annotation engine 48 searches for a window having a class ID LiveMeeting: FrameWindow, and when this window is found, the annotation engine 48 determines its position and size (step 204). At step 206, an annotation layer having the same size and position as the region, as indicated by the thick border 244, is created by the annotation engine 48 and is superimposed over the region 240.

Figure 5A:
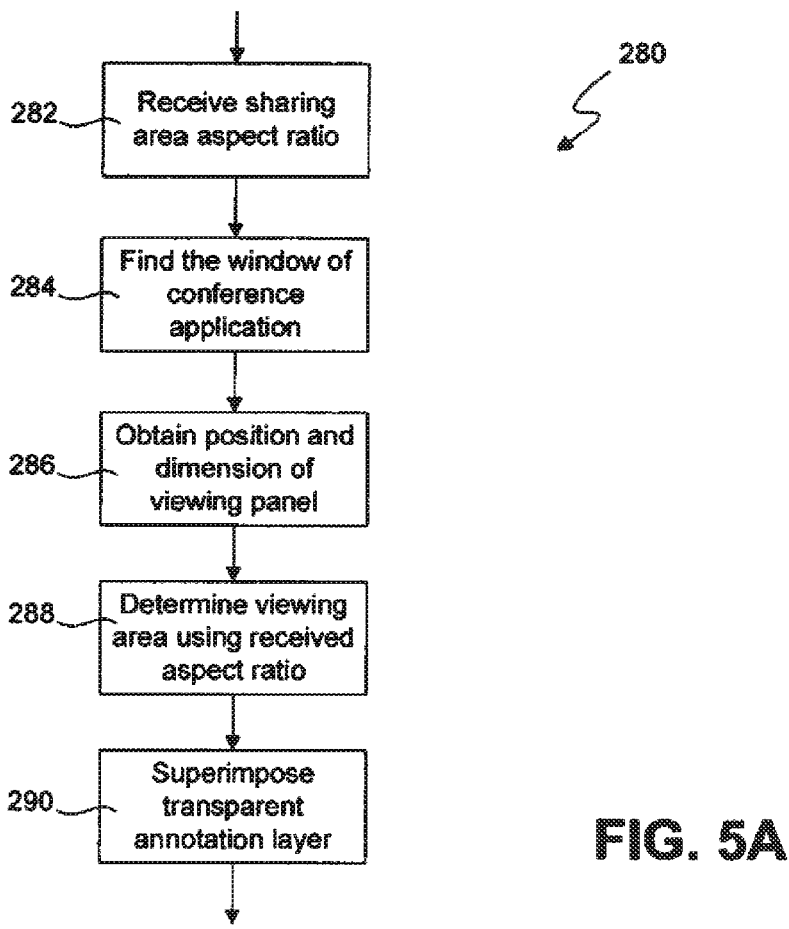
FIG. 5A is a flowchart showing exemplary steps for superimposing a transparent annotation layer over the shared display region.
Figure 5B:
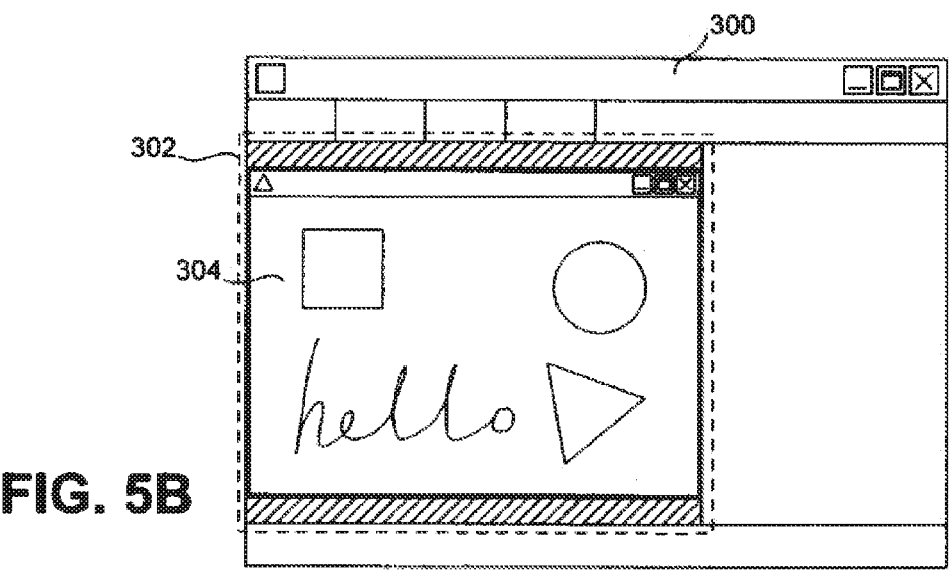
FIG. 5B shows an exemplary conference application window.

In the next step, the annotation engine 48 calculates the aspect ratio of the region 240, and transmits the aspect ratio via the annotation connection 54 to the annotation engines 48 of other computing devices 12 (step 208). The exemplary steps for superimposing a transparent annotation layer over the shared display screen image at each of the other computing devices 12 (step 110 of FIG. 3) are shown in FIG. 5A, generally identified by reference numeral 280. These steps will be described with reference to FIG. 5B showing an exemplary Microsoft® Live Meeting window at each other computing device 12 within which received shared display screen images are presented.

At step 282, when each other computing device 12 receives the aspect ratio of the region 240, the annotation engine 48 thereof searches for the window of the conference application 50 showing the shared display screen image (step 284), such as, a window having class ID PWFrame: WrapperConsoleWindow. When such a window 300 is found, the annotation engine 48 further searches for a viewing control panel 302 of the conference application 50 to determine its size and position (step 286). For example, the annotation engine 48 searches for the class IDs PWShareSlide and PWPleaseWaitPage, which are superimposed over the viewing control panel 302 of the Live Meeting window 300. When PWShareSlide is visible and PWPleaseWaitPage is hidden, the shared display screen image is displayed on the viewing control panel 302. The annotation engine 48 then obtains the position and size of the viewing control panel 302. At step 288, the annotation engine 48 finds the region 304 showing the shared display screen image by calculating a region centered and best fit into the viewing control panel 302 with the aspect ratio of the shared display screen image received from the presenting computing device 12. Exemplary pseudo code for calculating the width (W) and height (H) of the region 304 is shown below, where $W_v$ and $H_v$ represent the width and height, respectively, of the viewing control panel 302, and R=W/H is the received aspect ratio.

```
H = H_v;
W = RH;
If W > W_v then
    W = W_v;
    H = W/R;
End if;
```

At step 290, the annotation engine 48 then creates a transparent annotation layer having the same size as the region 304, and superimposes the annotation layer over the region 304. As will be appreciated, the method described above is readily applicable for superimposing a transparent annotation layer over display screen images shared by other conference applications 50 that use particular window class IDs to identify the region in which the display screen image to be shared is presented and to identify the conference application windows within which the shared display screen image are to be presented.

Figure 6:
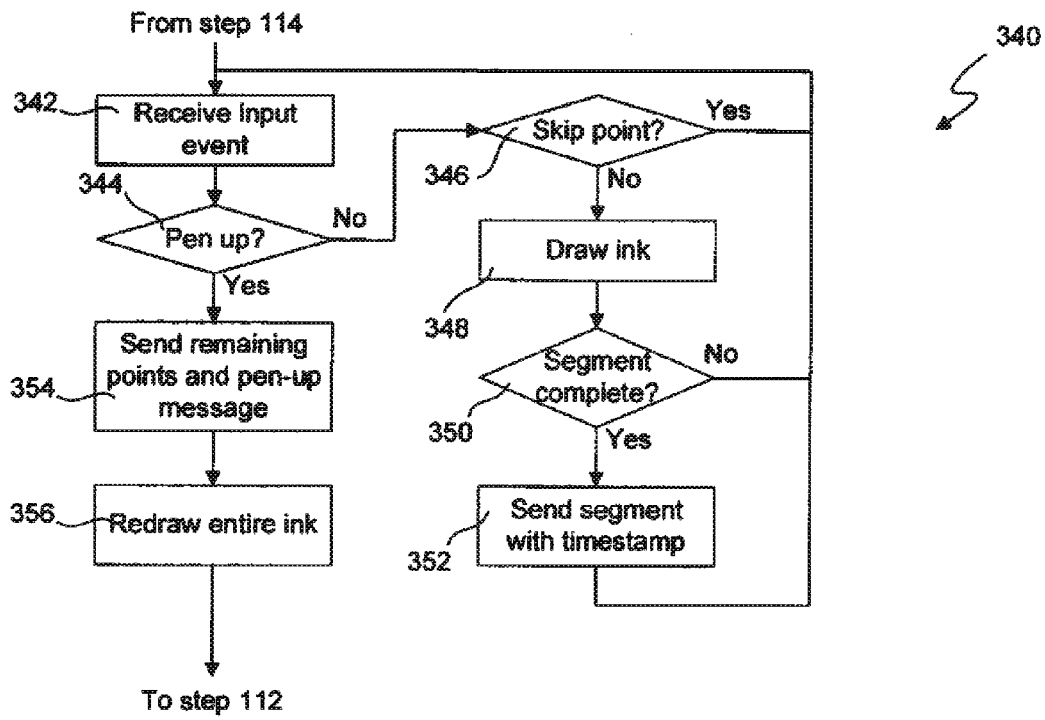
FIG. 6 is a flowchart showing exemplary steps for drawing ink on the transparent annotation layer.
Figure 7:
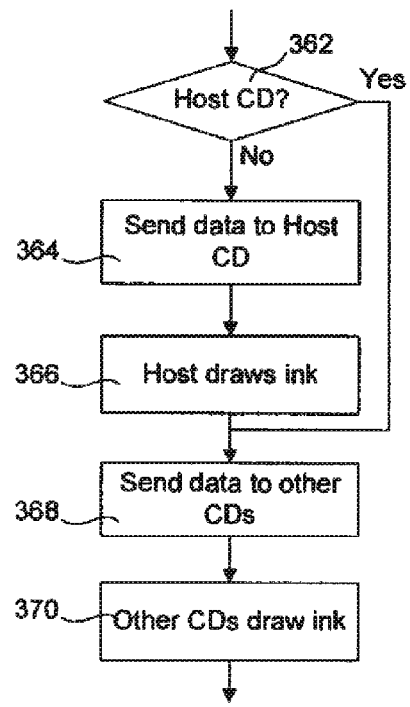
FIG. 7 is another flowchart showing exemplary steps for drawing ink on the transparent annotation layer.
Figure 8:
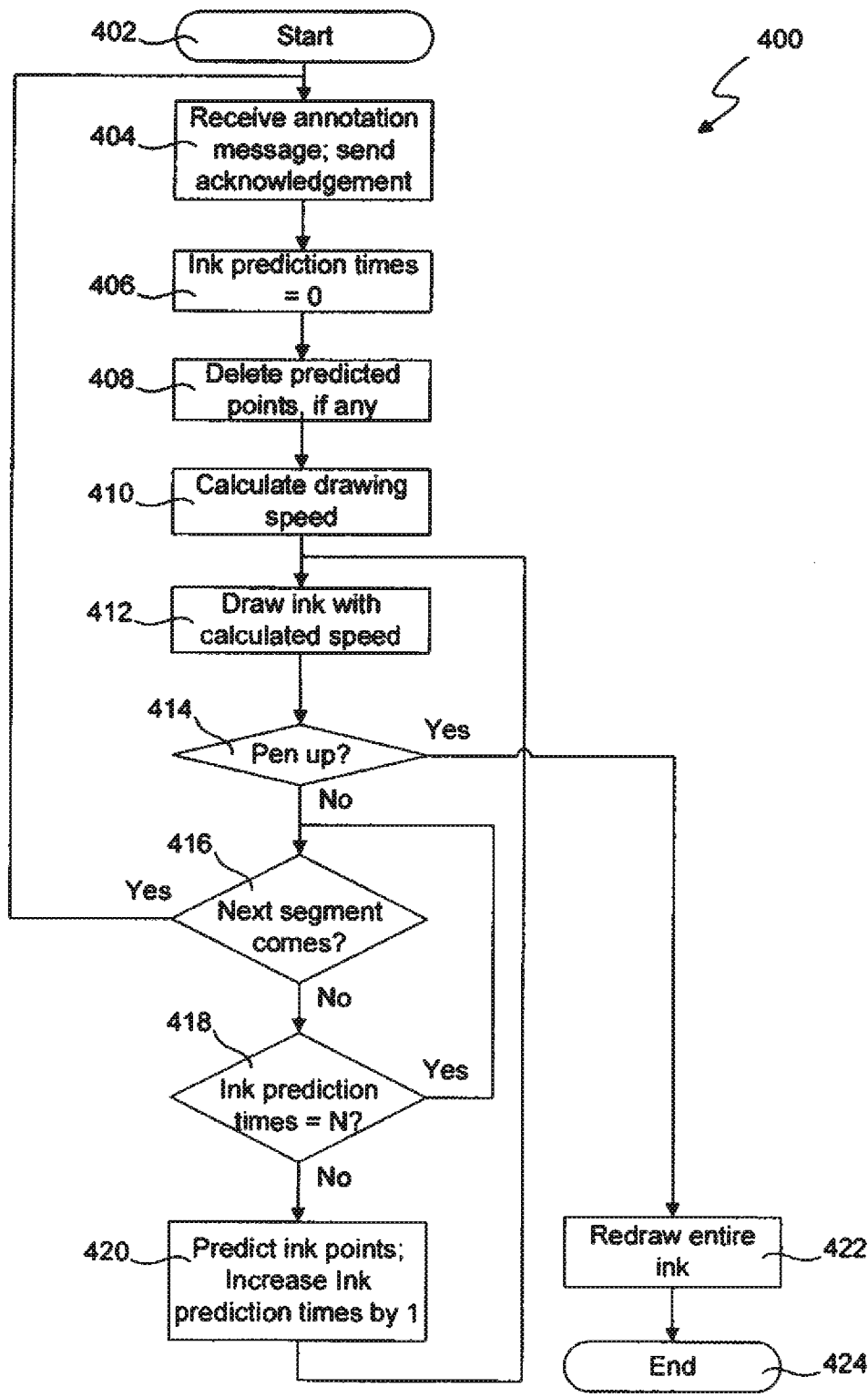
FIG. 8 is another flowchart showing exemplary steps for drawing ink on the transparent annotation layer.

Exemplary steps for drawing digital ink during an annotation input operation at a presenting computing device 12 (step 116 of FIG. 3) are shown in FIGS. 6 to 8. The annotation engine 48 at the presenting computing device 12 draws ink as ink sample points are received in response to pointer events during a Draw Ink input event. The ink sample points are represented by (x,y) coordinates corresponding to the location of a pointer from its initial pointer down position and throughout its movement until lifted. The annotation engine 48 groups ink sample points into segments with each ink segment comprising a plurality of consecutive ink sample points. As the annotation engine 48 forms each ink segment, the ink segment is sent to other computing devices 12 via annotation messages that also comprise the ink ID assigned to the annotation input operation. In response, the annotation engine 48 of each computing device, that receives an annotation message, draws the received ink segment on its respective annotation layer. In this embodiment, time based ink segmentation is employed, such that each ink segment comprises the consecutive ink sample points input to the presenting computing device 12 during a segmentation time period T. Generally, the segmentation time period T is set within a range, such as, 50 milliseconds to 500 milliseconds, depending on the network traffic between the presenting computing device 12 and other computing devices 12.

As will be described later, when the host computing device 12 is the presenting computing device 12, the host computing device 12 sends each annotation message to the other computing devices 12, and starts a timer. In response to receipt of an annotation message, each of the other computing devices returns an acknowledgement message to the presenting (host) computing device 12. If the presenting (host) computing device 12 receives an acknowledgement message from a predefined number of other computing devices 12 (for example, 80% or 100% of the other computing devices 12) within a predefined time period $T_R$, the presenting (host) computing device 12 decreases the segmentation time period T by a predefined value. The presenting (host) computer device 12 continues to monitor the timer, and decreases the segmentation time period T every time the presenting (host) computing device receives acknowledgement messages from the predefined number of other computing devices within the time period $T_R$, until the segmentation time period reaches its minimum value (e.g. 50 milliseconds). However, if the presenting (host) computing device 12 does not receive an acknowledgement message from the predefined number of other computing devices 12 within the time period $T_R$, the presenting (host) computing device 12 increases the segmentation time period T by a predefined value. The presenting (host) computing device 12 continues to monitor the timer, and increases the segmentation time period T every time the presenting (host) computing device 12 does not receive acknowledgement messages from the predefined number of other computing devices 12 within the time period $T_R$, until the segmentation time period T reaches its maximum value (e.g., 500 milliseconds).

When the presenting computing device 12 is not the host computing device 12, each annotation message formed by the presenting computing device is sent to the host computing device 12, which then forwards the annotation message to all other computing devices 12. Each time the presenting computing device sends an annotation message to the host computing device, the timer is initiated. In response to received annotation messages, each of the other computing devices 12 returns an acknowledgement message to the host computing device. The host computing device 12 in turn forwards the acknowledge messages to the presenting computing device 12. The presenting computing device 12 then increases or decreases the segmentation time period T within its maximum and minimum values as described above depending on the number of acknowledgment messages received from the host computing device within the predefined time period $T_R$.

Exemplary steps for drawing ink on an annotation layer at the presenting computing device 12 by the annotation engine 48 during a Draw Ink input event are shown in FIG. 6, generally identified by reference numeral 340. As previously described, these steps are performed when a pointer down event occurs, and are repeated for subsequent pointer move events until a pointer up event occurs. At step 342, the presenting computing device 12 receives an input event from input device, e.g., the interactive board 18 or mouse coupled thereto, and the annotation engine 48 at the presenting computing device 12 determines whether the input event is a pointer up event, a pointer move event or pointer down event (step 344). When a pointer move or pointer down event is detected, each ink sample point comprising a pair of (x,y) coordinates identifying the position of the pointer 32 or mouse is recorded. Although not shown in FIG. 6, as mentioned previously when the input event is a pointer down event, the new ink ID is generated. The annotation engine 48 at the presenting computing device 12 further determines whether the ink sample point should be skipped (step 346). For example, when the ink sample point is close to a previous ink sample point with a distance less than a predefined threshold $D_{min}$, the ink sample point is skipped, i.e., it is not drawn on the annotation layer, and is not transmitted to the other computing devices 12. The process then returns to step 342 to await receipt of the next input event. At step 346, when the annotation engine 48 at the presenting computing device 12 determines that the ink sample point should not be skipped (the ink sample point is beyond the threshold distance from the previous ink sample point), the annotation engine 48 at the presenting computing device 12 draws ink joining the input ink sample points (step 348). The annotation engine 48 at the presenting computing device 12 then determines whether the current ink segment is complete (step 350). When it is determined that the ink segment is incomplete, the process then returns to step 342 to await receipt of the next input event. However, if it is determined at step 350 that the current ink segment is complete, then the annotation engine 48 at the presenting computing device 12 sends an annotation message comprising the completed ink segment and ink ID together with a timestamp, indicating the elapsed time over which the ink sample points forming the completed ink segment were received by the presenting computing device 12, to the other computing devices 12 (step 352), and the process returns to step 342 to await receipt of the next ink event.

At step 344, when a pointer up event is received, the ink drawing process is deemed to be completed and the presenting computing device 12 sends an annotation message comprising the remaining ink sample points (i.e., the ink sample points received from the input device following transmission of the last completed ink segment) and ink ID together with a timestamp as well as a pointer up event message, to the other computing devices 12 (step 354). The presenting computing device 12 then redraws the entire ink (step 356).

Exemplary steps performed at the presenting computing device 12 for sending data (steps 352 and 354 in FIG. 6), are shown in FIG. 7. The conference engine 46 at the presenting computing device 12 determines whether the presenting computing device 12 is the host computing device 12 (step 362), and when the presenting computing device 12 is the host computing device 12, then the presenting (host) computing device 12 sends either an annotation message comprising the completed ink segment (step 348) or an annotation message comprising the remaining ink sample points and a pointer up event message to other computing devices 12 via the annotation connection 54 (step 368). At step 362, when it is determined that the presenting computing device 12 is not the host computing device 12, then the presenting computing device 12 sends either an annotation message comprising the completed ink segment (step 348) or an annotation comprising the remaining ink sample points and a pointer up event message to the host computing device 12 (step 364). In response, the annotation engine 48 of the host computing device 12 draws the completed ink segment or the remaining ink sample points on its annotation layer (step 366), and then sends the received annotation message to other computing devices 12 via the annotation connection 54 (step 368). At step 370, the annotation engines 48 of the other computing devices 12 receiving the annotation message either draw the completed ink segment or the remaining ink sample points on their respective annotation layers.

FIG. 8 shows the steps performed by the annotation engine 48 at each of the other computing devices 12 when drawing ink (steps 366 and 370 in FIG. 7), generally identified by reference numeral 400. In this exemplary embodiment, ink prediction is employed such that, when a subsequent or following ink segment has not been received by the other computing devices 12 after drawing of a current ink segment has been completed, the other computing devices 12 predict and draw a subsequent ink. Ink prediction may be performed a predefined number of times N, e.g., one time, but the ink prediction process is terminated whenever the next ink segment arrives.

When an annotation message is received at a client computing device 12 (step 404), the ink prediction time is reset by the annotation engine 48 to zero (step 406) and the acknowledgement message is returned to the host computing device. As mentioned above, the annotation message typically comprises an ink segment and the ink ID assigned to the ink segment together with the timestamp. At step 408, any predicted ink sample points are deleted, and the annotation engine 48 then calculates the speed at which the ink segment was drawn at the presenting computing device 12 (step 410). At this step, the annotation engine 48 extracts the timestamp $T_s$ associated with the received ink segment from the annotation message, and calculates the drawing speed $V_d$ as:

$$V_d = N_s/T_s, \qquad \text{Eq. (1)}$$

where $N_s$ is the number of ink sample points in the ink segment.

At step 412, the annotation engine 48 draws the ink segment with the calculated drawing speed, e.g., each ink sample point is drawn to the annotation layer with a time interval $1/V_d$, and is connected to the previous drawn ink sample point. A check is then made to determine if the annotation message comprises a pointer up event (step 414). At step 414, if the received annotation message comprises a pointer up event, the annotation engine 48 redraws the entire ink (step 422) and ends the process (step 424).

However, at step 414, if the annotation message does not comprise a pointer up event, the annotation engine 48 at the client computing device 12 determines whether another ink segment has arrived (step 416). If the next ink segment has arrived, the process returns to step 404. At step 416, if the next ink segment has not arrived, the annotation engine 48 checks to determine whether ink prediction has been performed N times (step 418). If ink prediction has not been performed N times, the annotation engine 48 then predicts ink points, increases the number of ink predictions N by one (1) (step 420) and returns to step 412 to draw the predicted ink points. At step 418, if ink prediction has been performed N times, no further ink prediction is performed and the annotation engine 48 returns to step 416 and simply awaits receipt of the next annotation message.

Figure 9:
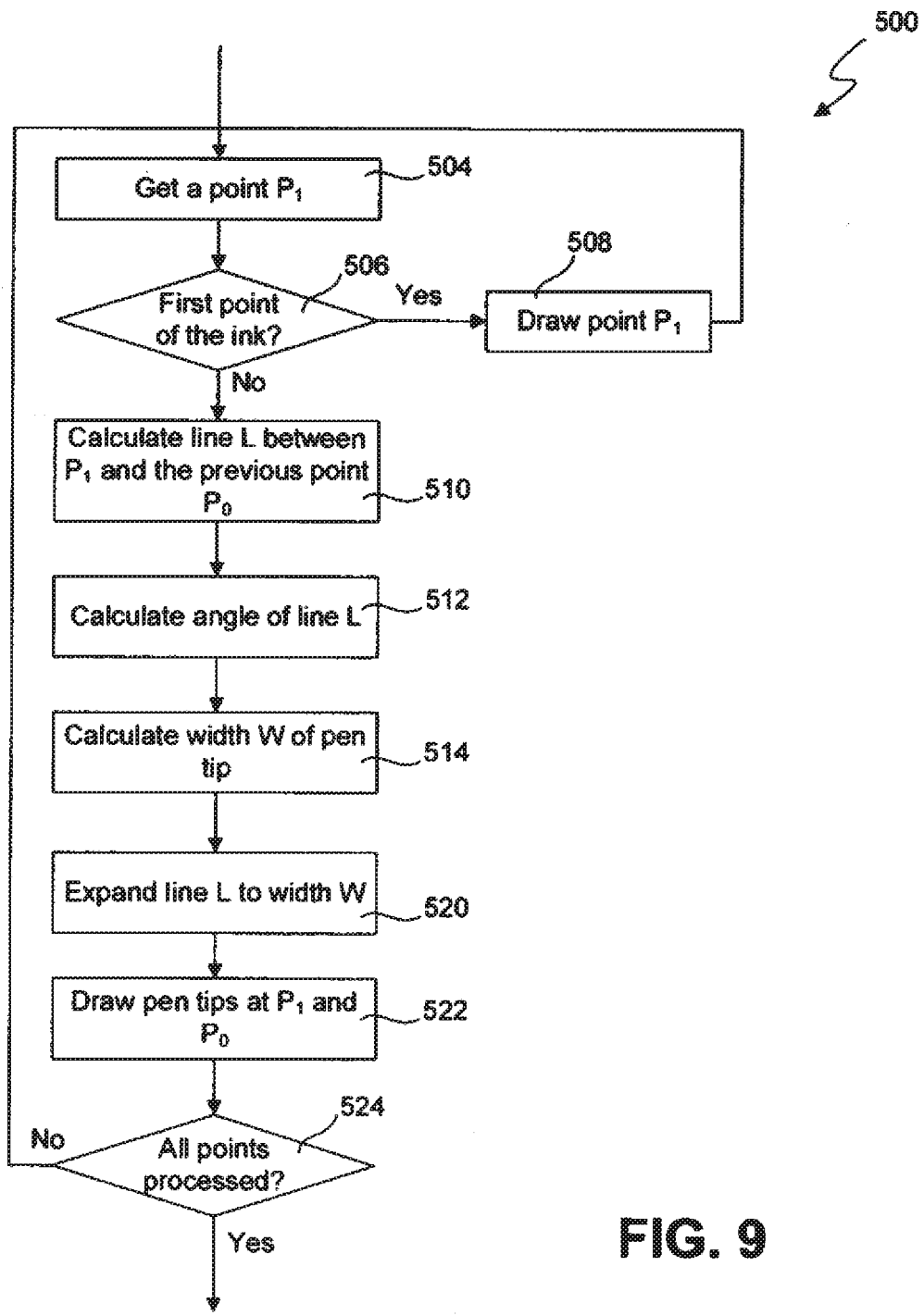
FIG. 9 is a flowchart showing exemplary steps for drawing calligraphic ink on the transparent annotation layer.

FIG. 9 shows the steps performed at computing devices 12 during drawing of calligraphic ink (ink of varying line thickness) on the annotation layers thereof (step 348 in FIG. 6, and step 412 in FIG. 8), generally identified by reference numeral 500. During drawing, when an ink sample point is received (step 504), the annotation engine 48 checks to determine if the ink sample point $P_1$ is the first point of the ink (e.g. corresponding to a pointer down event) (step 506). If so, the annotation engine 48 draws the ink sample point (step 508) and returns to step 504 to await the next ink sample point (e.g. corresponding to a pointer move event). If the ink sample point $P_1$ is not the first point of the ink, the annotation engine 48 calculates a line L between the ink sample point $P_1$ and the previous ink sample point $P_0$ (step 510). The annotation engine 48 then calculates an angle $\theta_1$ of the line L (step 512), and calculates the width W of the pointer tip, such as a pen tip, that will be applied to draw the ink based on the angle $\theta_1$.

FIG. 10A further illustrates how the angle of line L is calculated at step 512. After calculating the line L between the ink sample points $P_1$ and $P_0$, the annotation engine 48 calculates the angle $\theta_0$ from the x-axis to line L, and a predefined angle $\phi$, e.g., 60 degrees is subtracted from the angle $\theta_0$, to obtain an adjusted angle $\theta_1$. Subtraction of angle $\phi$ effectively rotates the x-y coordinate system by the angle $\phi$ to a rotated coordinate system x'-y', as shown in FIG. 10B.

At step 514, the width W of the pen tip applied to the ink portion between ink sample points $P_0$ and $P_1$ is calculated based on the angle $\theta_1$. In this exemplary embodiment, the annotation engine 48 maintains a user changeable pen tip width $W_p$, and the width W of pen tip applied to the ink portion between ink sample points $P_0$ and $P_1$ varies between a maximum value $W_{max}$ and a minimum value $W_{min}$, such as for example, $$W_{max}=W_p, \text{ and } W_{min}=0. \quad \text{Eq. (2)}$$

Referring to FIG. 10B, generally the width W is closer to width $W_{max}$ when ink sample point $P_1$ is closer to the x'-axis, and is closer to width $W_{min}$ when the ink sample point $P_1$ is closer to the y'-axis. In this exemplary embodiment, the annotation engine 48 first calculates an angle $\theta_2$ as:

$$\theta_2 = \begin{cases} \theta_1, & \text{if } 0 \le \theta_1 \le 90°, \\ |180° - \theta_1|, & \text{if } 90 < \theta_1 \le 270°, \\ 360° - \theta_1, & \text{if } 270 < \theta_1 < 360°, \end{cases} \quad \text{Eq. (3)}$$

where $|180°-\theta_1|$ represents the absolute value of $(180°-\theta_1)$. A width $W_1$ is then calculated as a linear function of $\theta_2$ as:

$$W_1=W_{max}+\theta_2(W_{min}-W_{max})/90. \quad \text{Eq. (4)}$$

The width $W_1$ is then truncated to a predefined range to obtain a width $W_2$ as:

$$W_2 = \begin{cases} R_1 W_p, & \text{if } W_1 < R_1 W_p, \\ W_1, & \text{if } R_1 W_p \le W_1 \le R_2 W_p, \\ R_2 W_p, & \text{if } W_1 > R_2 W_p, \end{cases} \quad \text{Eq. (5)}$$

where $R_1$ and $R_2$, respectively, are ratios, e.g., $R_1$=50% and $R_2$=70%. The pen tip width W is calculated from $W_2$ as:

$$W=R_3 W_2, \quad \text{Eq. (6)}$$

where $R_3$ is a scaling ratio, e.g., $R_3$=80%.

At step 520, line L is expanded to its left and right for a total width of W, and pen tips having a width of W are drawn at ink sample points $P_0$ and $P_1$ (step 522). At step 524, the annotation engine 48 determines whether all ink sample points of the ink portion to be drawn have been processed. If not, the process returns to step 504 to process the next ink sample point. When it is determined that all points of the ink portion to be drawn have been processed, then the drawing of the ink portion is deemed to be complete.

FIG. 11A illustrates drawing a portion of ink 600 comprising four (4) ink sample points 602 to 608. Following the above steps, the annotation engine 48 first calculates the line 610 between ink sample points 602 and 604. The angle of line 610 and consequently the pen tip width W are calculated as described above. The annotation engine 48 then expands line 610 to its left and right for a total width of W to form a rectangle 612 having a length equal to that of line 610 and a width of W. The rectangle 612 is tilled with the user selected color/texture (not shown in FIG. 11A). The annotation engine 48 then draws pen tip shapes 614 and 616, which are circles having a diameter of W centered at ink sample points 602 and 604, respectively, in this exemplary embodiment. The pen tip shapes 614 and 616 are also filled with the user selected color/texture (not shown in FIG. 11A). Similarly, ink portions between ink sample points 604 and 606, and between ink sample points 606 and 608, are also drawn. FIG. 11B shows the final ink portion of ink sample points 602 to 608 filled with black color.

Figure 12:
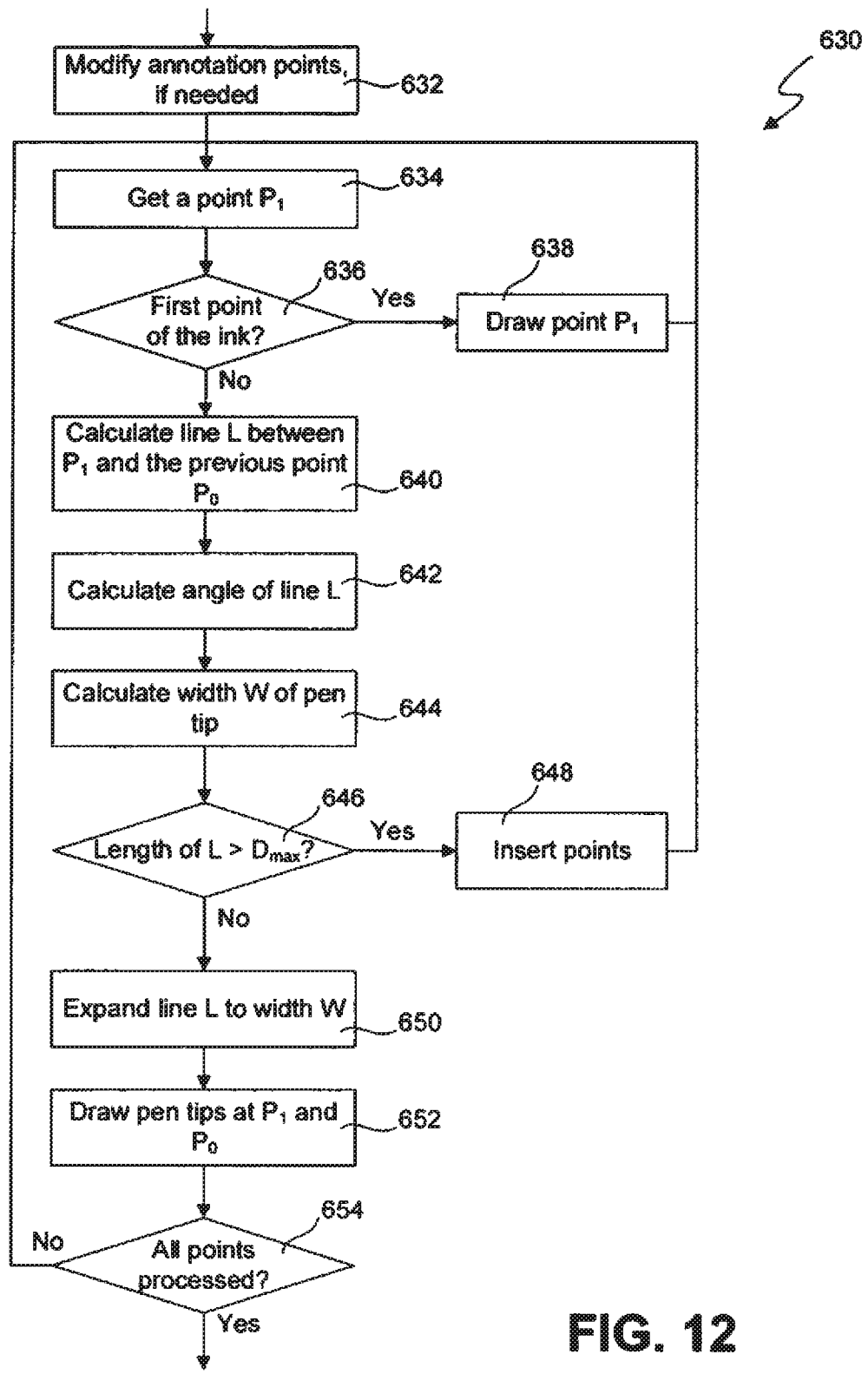
FIG. 12 is a flowchart showing exemplary steps for redrawing a calligraphic ink segment.

FIG. 12 shows exemplary steps performed during redrawing of entire ink (step 356 in FIG. 6 and step 422 in FIG. 8), generally identified by reference numeral 630. At step 632, the ink sample points of the entire ink are smoothed using a suitable smoothing function, such as for example a B-spline function. Steps 634 to 642 are the same as steps 504 to 512, respectively, of FIG. 9. At step 644, a width $W_1$ is calculated using Equations (2) to (4), and is truncated to a predefined range to obtain a width $W_2$ as:

$$W_2 = \begin{cases} R_4 W_p, & \text{if } W_1 < R_4 W_p, \\ W_1, & \text{otherwise}, \end{cases} \quad \text{Eq. (7)}$$

where $R_4$ is the ratio, e.g., $R_4$=5%.

The width $W_2$ is then compared with the pen tip width (denoted as $W_3$) applied to the previous ink sample point to determine the pen tip width W to be applied to the current ink sample point as:

$$W = \begin{cases} W_3 + R_5 W_p, & \text{if } W_2 > W_3 + R_5 W_p, \\ W_2, & \text{if } W_3 - R_5 W_p \le W_2 \le W_3 + R_5 W_p, \\ W_3 - R_5 W_p, & \text{if } W_2 < W_3 - R_5 W_p. \end{cases} \quad \text{Eq. (8)}$$

where $R_5$ is a ratio adjustable by user within a range, e.g., between 5% and 20%, via a system setting option.

At step 646, the annotation engine 48 determines whether the length of line L is greater than a predefined threshold $D_{max}$, and when the length of line L is greater than a predefined threshold $D_{max}$, the annotation engine 48 inserts points between ink sample points $P_0$ and $P_1$ along a curve C by applying a smoothing function. For example, a B-spline function is applied to points $(P_a, P_0, P_1$ and $P_b)$, where point $P_a$ is the point before point ink sample point $P_0$, and point $P_b$ is the point after ink sample point $P_1$ (step 648), that is, when points $P_a$ and $P_b$ exist, as will be described later. The process then returns to step 634 to obtain the next point (which is the inserted point closest to ink sample point $P_0$). However, at step 646, when it is determined that the length of L is less than the predefined threshold $D_{max}$, line L is expanded to its left and right for a total width of W (step 650). As such, step 650 corresponds to step 520 in the flowchart of FIG. 9, while steps 652 and 654 correspond to steps 522 and 524 in the flowchart of FIG. 9, respectively.

Figure 13C:
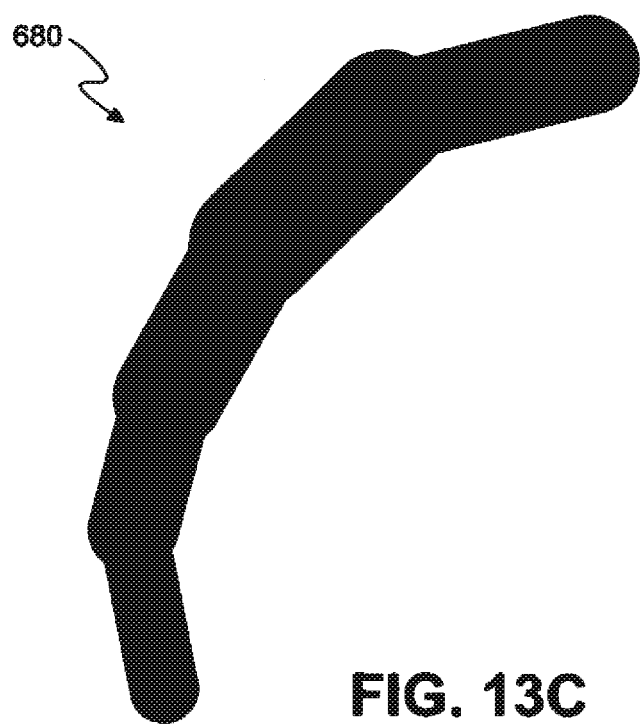

FIGS. 13A to 13C show an exemplary drawing of an ink portion 680 comprising inserted points (at step 648). In FIG. 13A, the ink portion between ink sample points 682 and 684 has been drawn and comprises a rectangle 690 having a width $W_a$, and pen tip shapes 692 and 694 having diameter $W_a=R_a W_p$. The annotation engine 48 has also calculated the line 696 between ink sample points 686 and 684, and has determined the pen tip width $W_b=R_b W_p$ for drawing the ink portion therebetween.

When the length of line 696 is greater than the predefined threshold $D_{max}$, a smoothing curve 700 is applied to points

682 to 688 to calculate points to be inserted between ink sample points 684 and 686, as shown in FIG. 13B. The insertion of points is based on a maximum change of $R_6$ (e.g., 2% in this exemplary embodiment) of $W_p$ per point. The annotation engine 48 then calculates the number of points $N_i$ to be inserted along the smoothing curve 700 as:

$$N_i = \text{UPPER}(|R_b - R_a|/R_6) - 1, \qquad \text{Eq. (9)}$$

where UPPER(x) represents the smallest integer greater than x.

The annotation engine 48 then inserts $N_i$ points (e.g., points 702 and 704) equally spaced along the smoothing curve 700 between ink sample points 684 and 686. Following the steps shown in FIG. 12, the ink portion is then drawn from point 684 to points 702, 704 and 686, to form the final ink portion 680, as shown in FIG. 13C.

Figure 14A:
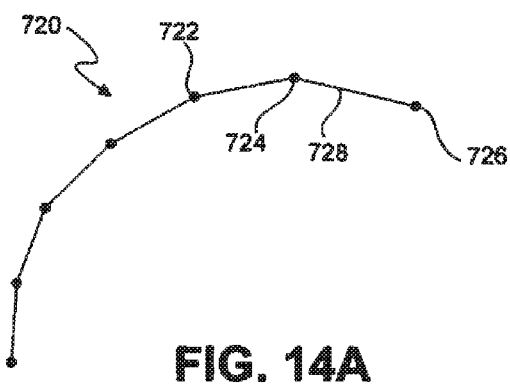
FIGS. 14A to 14D illustrate ink sample point prediction.
Figure 14B:
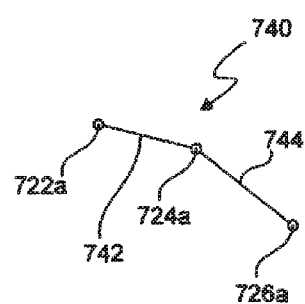
Figure 14C:
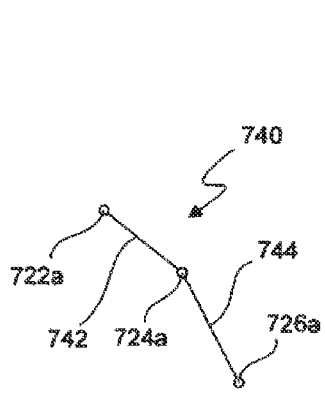
Figure 14D:
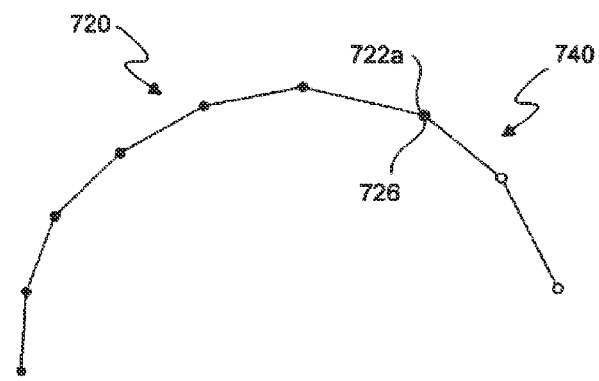

As mentioned above, when a client computing device 12 has completed drawing of a received ink segment, but the next ink segment has not arrived, the client computing device 12 predicts and draws ink points. FIGS. 14A to 14D illustrate ink prediction, and for ease of description, only the ink sample points are illustrated. FIG. 14A shows an exemplary ink segment 720 drawn on an annotation layer by the annotation engine 48 of the client computing device 12. When the next ink segment has not been received, the last several ink sample points, e.g., the last three (3) ink sample points 722 to 726, of the ink segment 720 are copied to form a new ink sample point set 740 comprising three ink sample points 722a to 726a. As shown in FIG. 14B, the ink sample point set 740 is rotated as a whole so that line 742 between ink sample points 722a and 724a is parallel to line 728 between ink sample points 724 and 726. In FIG. 14C, the ink sample point set 740 is further rotated as a whole so that line 742 after rotation is parallel to line 744 between ink sample points 724a and 726a before rotation. As shown in FIG. 14D, the ink sample point set 740 is merged with ink segment 720 by superimposing ink sample point 722a to ink sample point 726. As previously described, ink prediction may be performed one or more times, depending on the conferencing system design.

The annotation engine 48 of a presenting computing device 12 may erase a portion of or entire ink if an eraser tool is selected. In this exemplary embodiment, use of the eraser tool results in ink objects on the annotation layer being modified. The sample points of modified ink objects are sent to client computing devices 12 in the manner previously described. Each client computing device 12 then draws the modified ink objects on its annotation layer.

Figure 15A:
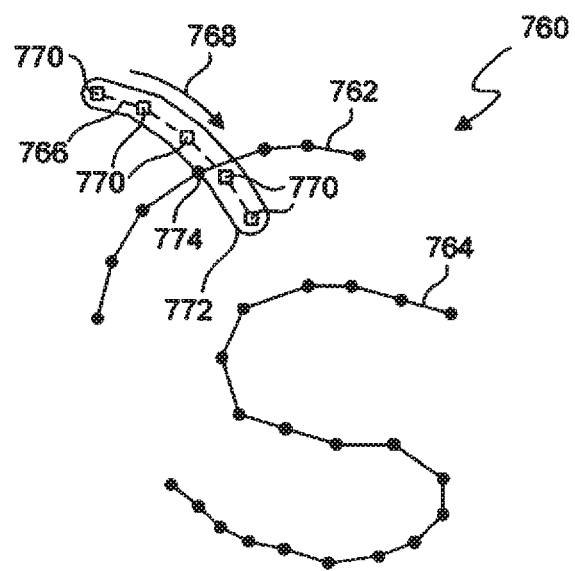
FIGS. 15A and 15B illustrate erasing of a portion of drawn ink.

FIG. 15A shows an exemplary annotation layer 760 of the presenting computing device 12, comprising two ink objects 762 and 764. For ease of description, only the ink sample points are illustrated. As an eraser tool (not shown) moves along a path 766 in a direction indicated by the arrow 768, that movement is detected by the presenting computing device 12. Eraser tool position samples are then transmitted to the client computing devices 12 in annotation messages as erasing sample points 770. The annotation engines 48 at the other computing devices 12 apply a user-selectable eraser shape along the path 766 to form an erasing mask 772 as disclosed in U.S. Pat. No. 6,326,954 to Ieperen, assigned to SMART Technologies ULC. Ink sample points overlapping with the erasing mask are then deleted.

Figure 15B:
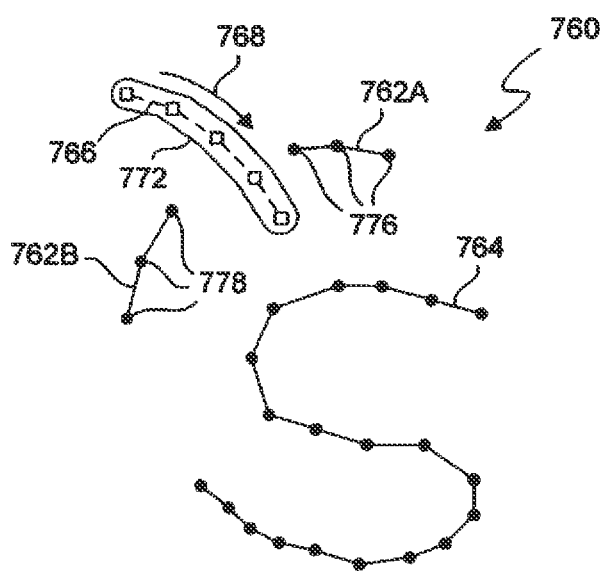

For example, when the eraser tool moves across the ink object 762, ink sample point 774, which overlaps with the erasing mask 772, is deleted. As shown in FIG. 15B, the remaining points 776 and 778, respectively, form two new ink objects 762A and 762B, and the original ink object 762 is then deleted. The annotation engine 48 of the presenting computing device 12 then sends an annotation message to other computing devices 12, which comprises the ink ID of ink object 762 with an indication of deletion, and the ink points 776 and 778, each associated with a new ink ID. Subsequently, the annotation engine 48 of the client computing devices 12 delete the ink object 762, and draw new ink objects 762A and 762B on their respective annotation layers. As ink object 764 does not overlap with the erasing mask, the ink object 764 remains on the annotation layer at each of the other computing devices 11

Although as described above, some ink sample points may be skipped, in some alternative embodiments, no ink sample points are skipped. In yet another embodiment, when the annotation engine at the presenting computing device 12 receives an ink sample point, the annotation engine modifies the position of the ink sample point by applying a smoothing function to the ink sample point and one or more previous ink sample points.

Although as described above, the pen tip width is calculated using a truncated linear function as in Equations (4) and (5), or (4) and (7), in some alternative embodiments, other functions may also be used, such as for example a second or higher order polynomial function, an exponential function, etc. In a related embodiment, widths $W_{max}$ and $W_{min}$, may take other values. In yet another related embodiment, Equation (6) is not used, i.e., pen tip width is equal to $W_2$.

In some alternative embodiments, when drawing ink as in FIG. 9, after calculating the pen tip width (step 514), points may be inserted between two consecutive ink sample points when the distance between the consecutive ink sample points is greater than a predefined threshold, using a suitable interpolation function, such as for example, B-spline, or linear interpolation, depending on conferencing system design.

In yet some other embodiments, Equation (8) is not used, i.e., the pen tip width is not limited to a maximum ratio of $R_5$. In still some other embodiments, other criteria may be used to determine the number of points to be inserted between two consecutive ink sample points. For example, the maximum and minimum values $W_{max}$ and $W_{min}$ may be determined based on the distance between two ink sample points. When the distance between two ink sample points $P_0$ and $P_1$ is greater than a predefined threshold, $W_{max}$ is set to $W_p$, and $W_{min}$ is set to a small a fraction, e.g., 5%, of $W_p$; otherwise, W is set to 70% of $W_p$, and $W_{min}$ is set to 50% of $W_p$.

Although in above embodiments, B-spline interpolation is used to insert points when the distance between the two consecutive ink sample points is greater than a threshold, in some alternative embodiments, other interpolation methods such as for example, linear interpolation, may be used to insert points. Alternatively, in some alternative embodiments, no points are inserted.

In some alternative embodiments, some input events in the cursor mode may be interpreted as zooming-in on selected ink objects. When such an event occurs, the distances between ink sample points and the pen tip size $W_p$ are then zoomed in by the calculated zooming ratio, and the ink is redrawn as described above. In yet some other embodiments, it after zooming, the distance of two consecutive ink sample points is greater than a predefined threshold (which may or may not be equal to predefined threshold $D_{max}$ depending on the conference system design), ink sample points are inserted therebetween and then the ink is redrawn as described above.

Although in above embodiments, when the presenting computing device 12 receives an ink sample point, the presenting computing device 12 only draws the portion of the ink from the previous point to the received point, in some alternative embodiments, when the presenting computing device 12 draws a portion of ink, the presenting computing device 12 may draw ink from the first point of the ink to the latest received point.

Although in above embodiments, when a client computing devices 12 receives an ink segment, it draws the segment only, in some alternative embodiments, the client computing device 12 may draw ink from the first point of the ink to the last point of the ink segment received.

Those skilled in the art will appreciate that other ink prediction methods may be used in alternative embodiments. For example, in an alternative embodiment, the line $L_p$ between the last two points of the ink segment is calculated. Prediction points are then appended to the ink segment along the direction of line $L_p$ with a distance to the previous point equal to the length of line $L_p$. In another exemplary embodiment, a fitting curve is calculated using the last several points and then extrapolated to obtain prediction points for appending to the ink segment.

Although in above embodiments, when a pointer up event is received, the annotation engine 48 redraws the entire ink, in some alternative embodiments, this step is optional, and may or may not be used depending on the conferencing system design.

In some alternative embodiments, the envelope of the ink is further smoothed by filtering it each time before it is filled with user selected color/texture. In yet some other embodiments, ink envelope smoothing is performed only when the entire ink is received (i.e., when a pen-up event is received).

Other techniques to draw calligraphic ink may also be employed by the computing devices 12. FIGS. 16A to 16G illustrate an alternative method used to draw calligraphic ink. In this example, a segment of ink 800 comprising three (3) ink sample points 802 to 806 is shown. The annotation engine 48 first calculates the line 808 between ink sample points 802 and 804. The angle of line 808 and consequently the pen tip width $W_{P0}$ are calculated as described above. The annotation engine 48 also calculates the line 810 between ink sample points 804 and 806, and determines the corresponding pen tip width $W_{P1}$.

The annotation engine 48 then calculates a circle 812 of radius $W_{P0}/2$, centered at ink sample point 802 and having a small gap 814. In this embodiment, the gap takes a small value, e.g., between 1° to 20°, and is located near line 808 to ensure that the gap will be within the ink outline to be built.

Figure 16A:
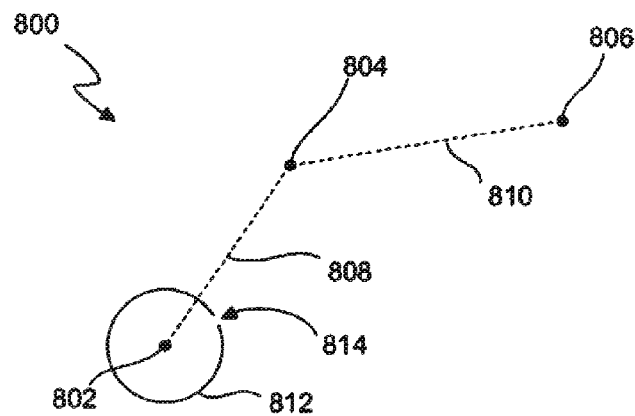
FIGS. 16A to 16G illustrate an alternative calligraphic ink segment formation technique.
Figure 16B:
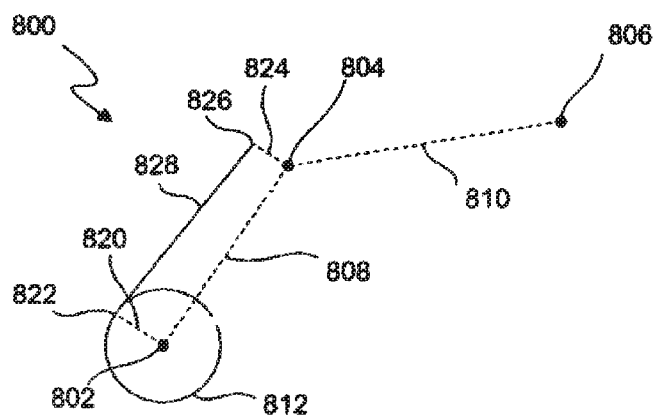

As shown in FIG. 16B, the annotation engine 48 then calculates a line segment 820 perpendicular to line 808 and extending radially from ink sample point 802 to the left side of line 808 with a width of $W_{P0}/2$. The annotation engine 48 also calculates a line segment 824 perpendicular to line 808 and extending from ink sample point 804 to the left side of line 808, with a width of $W_{P1}/2$. Then, the annotation engine 48 calculates the line 828 connecting the end points 822 and 826 of the line segments 820 and 824, respectively.

Figure 16C:
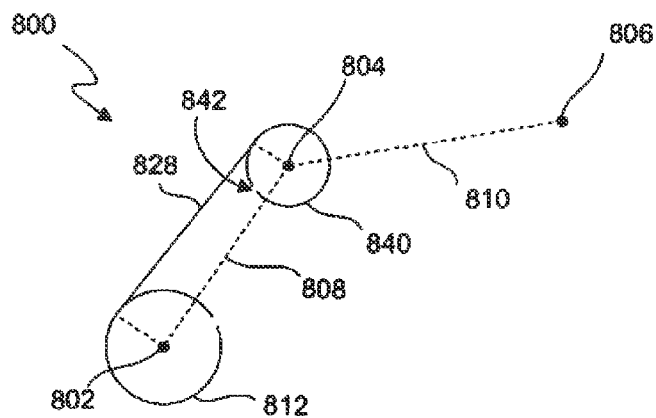

As shown in FIG. 16C, the annotation engine 48 compares the angle between lines 808 and 810, and, if the angle therebetween is larger than a predefined threshold (e.g., about 10°), which is the case in this example, calculates a circle 840 of radius $W_{P1}/2$, centered at point 804 and having a small gap 842 near line 808. If the angle therebetween is smaller than a predefined threshold, no circle is calculated at this step.

The annotation engine 48 then calculates the pen tip width for ink sample point 806. In this example, ink sample point 806 is the last point of the portion of the ink to be processed. Therefore, the pen tip width of ink sample point 806 takes the value $W_{P1}$ of the previous ink sample point, i.e., point 804. However, those skilled in the art will appreciate that if ink sample point 806 is not the last point of the portion of the ink to be processed, its width would be calculated based on the angle of the line between ink sample point 806 and the next ink sample point.

Figure 16D:
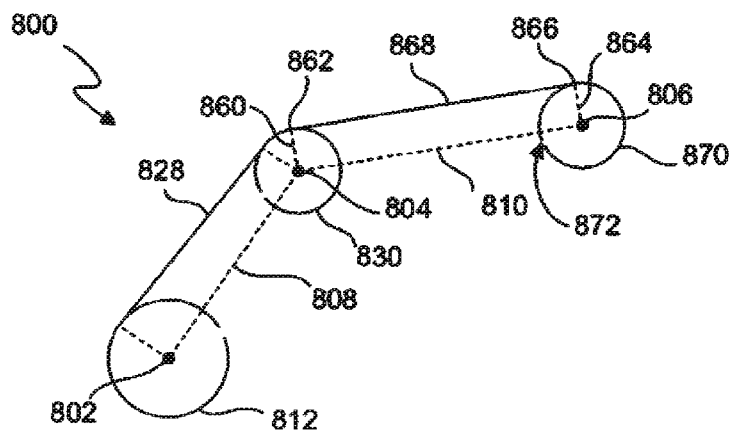

As shown in FIG. 16D, the annotation engine 48 then calculates a line segment 860 perpendicular to line 810 and extending radially from ink sample point 804 to the left side of line 810, with a width of $W_{P1}/2$. The annotation engine 48 also calculates a line segment 864 perpendicular to line 810 and extending radially from point 806 to the left side of line 810, with a width equal to half of the pen tip width of ink sample point 806, which in this example is $W_{P1}/2$. Then, the annotation engine 48 calculates the line 868 connecting the end points 862 and 866 of the line segments 860 and 864, respectively. A circle 870 of radius $W_{P1}/2$ centered at point 806 and having a small gap 872 near line 810 is then calculated.

Figure 16E:
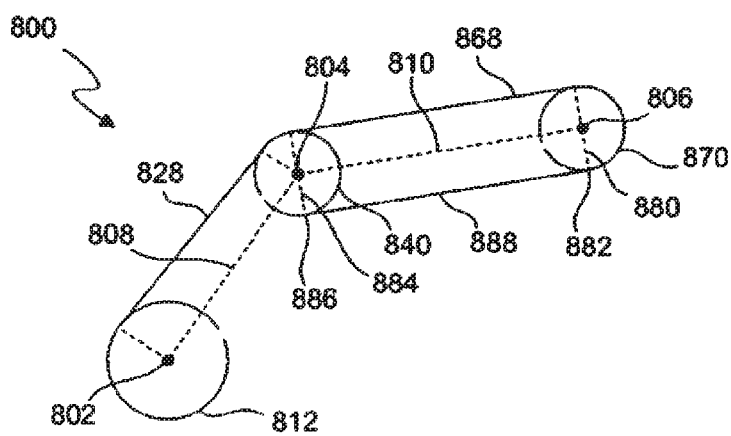

After calculating the circle 870 around the last ink sample point 806, as shown in FIG. 16E, the annotation engine 48 calculates a line segment 880 perpendicular to line 810 and extending radially from ink sample point 806 to the right side of line 810, with a width equal to half of the pen tip width of ink sample point 806, which in this example is $W_{P1}/2$. Similarly, a line segment 884 is calculated, which is perpendicular to line 810 and extending radially from ink sample point 804 to the right side of line 810, with a width $W_{P1}/2$. The annotation engine 48 then calculates the line 888 connecting the end points 882 and 886 of the line segments 880 and 884, respectively.

Figure 16F:
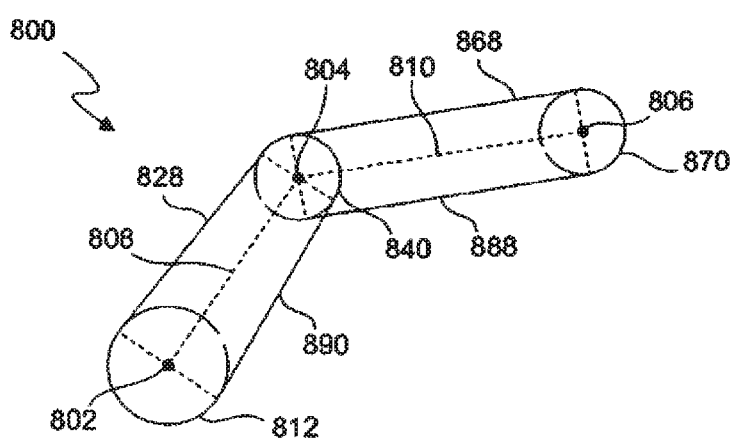
Figure 16G:
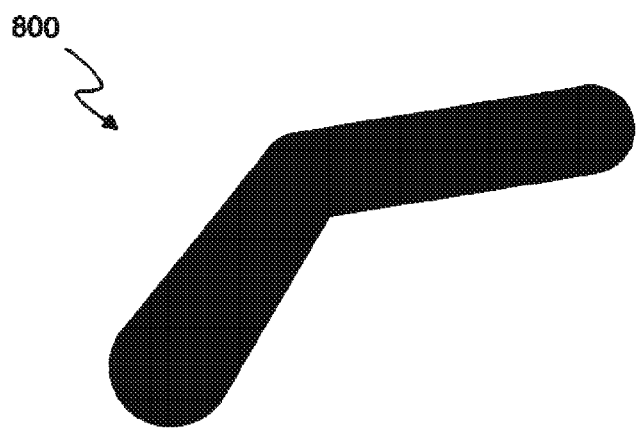

Similarly, as shown in FIG. 16F, a line 890 is calculated on the right side of line 808 between in sample points 802 and 804. The calculated circles and lines 812, 828, 840, 868, 870, 888, and 890 define the outline of a path forming the calligraphic ink portion from ink sample points 802 to 806. A path-tilling function provided by the operating system running on the computing device is then used to draw the calligraphic ink segment in the user-designated color. In this example, the operating system is Microsoft® Windows XP, and the path-filling function provided by this operating system is defined as:

virtual HRESULT FillPath(const SDBrush *brush, const SDGraphicsPath *path);

where the parameter *brush is a pointer to a brush object having user-designated color, and the parameter *path is a pointer to a path object consisting of the ordered aggregation of calculated circles and lines 812, 828, 840, 868, 870, 888, and 890. The FiliPath function then determines the area enclosed by the path and fills it using the brush object defined in the parameter *brush. The final result of the calligraphic ink segment is shown in FIG. 16G.

As will be appreciated, this method of drawing calligraphic ink may be used to draw one or more segments of complete calligraphic ink or the entire calligraphic ink.

Figure 17A:
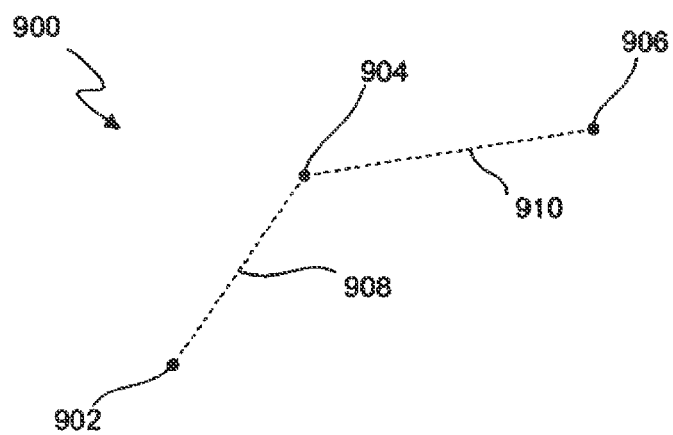
FIGS. 17A and 17B illustrate another alternative calligraphic ink segment formation technique.

In yet another embodiment, a calligraphic ink stroke is drawn using the above described method only when the entire ink stroke is received by the annotation engine 48 (e.g., an end-ink-stroke indication is received from the presenting computing device). In this case, before, the entire ink stroke has been completed, the annotation engine 48 receives ink sample points as described above, and draws each ink segment using a simplified method. For example, as shown in FIG. 17A, when the annotation engine 48 receives a segment of ink 900 comprising three ink sample points 902 to 906, it first calculates the lines 908 and 910 between each pair of consecutive ink sample points, and determines the pen tip width for each point, except the last ink sample point 906, based on the angle of the line starting therefrom. In this example, the pen tip width for ink sample point 902 is calculated to be $D_1$ and the pen tip width for ink sample point 904 is calculated to be $D_2$.

Figure 17B:
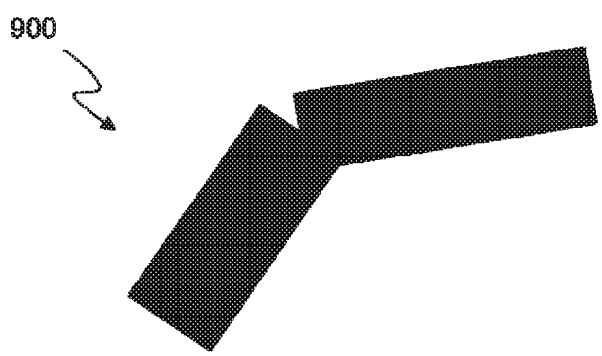

Then, the annotation engine 48 calls a line-drawing function provided by the operating system of the computing device to draw a line between each pair of consecutive points using the pen tip widths. In this embodiment, the line-drawing function provided by the Windows XP operating system is defined as:

virtual HRESULT DrawLine(const SDPen *pen, const PointF &pt1, const PointF &pt2):

where the parameter *pen is a pointer to the pen object to be used to draw the line, and the width of which has been set to the required line width. Parameters &pt1 and &pt2 are the starting and ending points of the line to be drawn. The final result of the ink segment is shown in FIG. 17B.

When the annotation engine 48 has received the complete ink stroke, it redraws the entire calligraphic ink stroke using the method illustrated in FIGS. 16A to 16G.

Although in the embodiment illustrated in FIGS. 16A to 16G, the small gap of each circle is located near the corresponding line between two ink sample points to ensure that the small gap is within the outline to be built, in some alternative methods implemented on Microsoft Windows operating systems or Apple Mac OSX operating systems, the small gap of each circle can be arbitrarily located.

Those of skill in the art will appreciate that the calligraphic ink drawing techniques described herein are not limited for use in a conferencing system as described. Rather these drawing techniques may be used in virtually any digital ink drawing environment where line-segment based digital ink is to be rendered.

Those skilled in the art will appreciate that, instead of using the above described calligraphic ink drawing methods, the conferencing system as illustrated in FIGS. 1 and 2 may use any known ink drawing method to inject ink to the annotation layer.

Although in above embodiments, the conferencing system comprises a conference engine 46 and an annotation engine 48 on each computing device 12, the conference engine 46 and annotation engine 48 may be integrated as a single module. Also, although in above embodiments, the conferencing system 10 comprises a conference engine 46 and a conference application 50 on each computing device 12, in some alternative embodiments, the conference engine 46 and a conference application 50 may be integrated as a single module.

In another exemplary embodiment, the connection 52 may be a direct connection among all conference engines 46, or may be a connection among conference engines 46 via a server (not shown). For example, a user may schedule a conference with a list of participants, via Microsoft Outlook connecting to a Microsoft Exchange server. An email invitation is sent to every participant, and at the scheduled conference time, the conference engine 46 on the user's computing device 12 starts a conference session on a conference server, and becomes the host computing device 12. A connection 52 is then established between the conference engine 46 of the host computing device 12 and the conference server. Other conference participants may follow the instructions in the conference invitation to join the conference. When a computing device 12 joins the conference, a connection 52 is established between the conference engine 46 of the computing device and the server.

In an alternative embodiment, a user may start a conference session on a computing device 12, and send a conference invitation to users on other computing devices 12 via email, or via instant message, with information including, e.g., address of the host computing device 12 and conference login password. Other users then join the conference using the received conference information. When a computing device 12 joins the conference, a connection 52 is established between the conference engine 46 of the host computing device 12 and the conference engine 46 of the computing device 12.

In yet another exemplary embodiment, the conference application 50 sends the position and size of the display screen image to be shared to the annotation engine 48 when the conference application 50 starts sharing the display screen image.

Although in above embodiments, connection 54 is a direct connection among all annotation engines 48, in some alternative embodiments, the connection 54 between the annotation engines 48 may be implemented via an annotation server (not shown). As such, the presenting computing device 12 sends ink sample points to the annotation server, and the annotation server forwards received ink sample points to other computing devices 12.

Although embodiments have been described above with reference to the accompanying drawings, those of skill in the art will appreciate that variations and modifications may be made without departing from the scope thereof as defined by the appended claims.

What is claimed is:

1. A conferencing system comprising:
a plurality of computing devices for communicating over at least one network during a conference session, at least one of said computing devices being configured to share content displayed thereby with other computing devices, the other computing devices being configured to display the shared content, at least one of said computing devices also being configured to accept input annotations made on the displayed shared content and to share the input annotations with the other computing devices over a channel independent of the shared content wherein at least one of said computing devices party to an annotation connection through the channel is configured to
create a transparent annotation layer over the displayed shared content, said transparent annotation layer being configured to accept input annotations and to display shared input annotations, the input annotations including digital ink annotations,
shared the digital ink annotations with other computing devices in segments that are received over a segmentation time period, and
adjust the segmentation time period based on received acknowledgements.

2. The conferencing system of claim 1 wherein a plurality of said computing devices is configured to share content, to accept input annotations and to share input annotations with other computing devices.

3. The conferencing system of claim 2 wherein when a computing device is conditioned to share content, the computing device establishes an annotation connection with said other computing devices.

4. The conferencing system of claim 1 wherein the shared content comprises a portion of or an entire display screen image.

5. The conferencing system of claim 4 wherein each computing device configured to share content comprises a conferencing application and wherein each computing device configured to accept and share input annotations comprises an annotation engine, the conferencing engines and annotation engines of said computing devices communicating over separate connections.

6. The conferencing system of claim 5 wherein shared content received by each other computing device is displayed in a window of said conference application.

7. The conferencing system of claim 5 wherein each annotation engine is conditioned to an annotation mode to receive the digital ink annotations in response to at least one of pointer interaction with an input surface or selection of a pointer icon.

8. The conferencing system of claim 1 wherein the segmentation time period is increased or decreased depending on the number of acknowledgements received within a threshold time period.

9. A method comprising;
accepting annotations input on a transparent annotation layer positioned over an image displayed by a computing device that is shared with at least one other computing device, said transparent annotation layer being configured to accept input annotations and to display shared input annotations;
transmitting said input annotations to said at least one other computing devices via a connection that is independent of the connection over which the image is shared, wherein the transmitted input annotations include digital ink annotations;
sharing the digital ink annotations with other computing devices in segments that are received over a segmentation time period; and
adjusting the segmentation time period based on received acknowledgements.

10. The method of claim 9 wherein the image and input annotations are shared with a plurality of other computing devices.

11. The method of claim 9 wherein the shared image is one of a portion or an entire display screen image.

12. The method of claim 9 wherein each computing device comprises a conferencing engine and an annotation engine, the conferencing engine and annotation engine of said computing devices communicating over separate connections.

13. The method of claim 9, further comprising increasing or decreasing the segmentation time period depending on the number of acknowledgements received within a threshold time period.

* * * * *